US010565065B2

(12) United States Patent
Guzik

(10) Patent No.: US 10,565,065 B2
(45) Date of Patent: Feb. 18, 2020

(54) DATA BACKUP AND TRANSFER ACROSS MULTIPLE CLOUD COMPUTING PROVIDERS

(71) Applicants: WHP WORKFLOW SOLUTIONS, INC., North Charleston, SC (US); GETAC TECHNOLOGY CORPORATION, Taipei (TW)

(72) Inventor: Thomas Guzik, Edina, MN (US)

(73) Assignees: GETAC TECHNOLOGY CORPORATION, Taipei (TW); WHP WORKFLOW SOLUTIONS, INC., North Charleston, SC (US)

( * ) Notice: Subject to any disclaimer, the term of this patent is extended or adjusted under 35 U.S.C. 154(b) by 689 days.

(21) Appl. No.: 15/197,709

(22) Filed: Jun. 29, 2016

(65) Prior Publication Data

US 2017/0046230 A1    Feb. 16, 2017

Related U.S. Application Data

(63) Continuation-in-part of application No. 12/894,698, filed on Sep. 30, 2010, now Pat. No. 10,419,722.
(Continued)

(51) Int. Cl.
*G06F 21/00* (2013.01)
*G06F 11/14* (2006.01)
(Continued)

(52) U.S. Cl.
CPC ...... *G06F 11/1464* (2013.01); *G06F 9/45558* (2013.01); *G06F 21/6218* (2013.01);
(Continued)

(58) Field of Classification Search
CPC .............................. G06F 16/188; G06F 16/122
(Continued)

(56) References Cited

U.S. PATENT DOCUMENTS 5,877,756 A    3/1999  Um
6,157,880 A   12/2000  Mersseman et al.
(Continued)

FOREIGN PATENT DOCUMENTS

EP      1550968 A1    7/2005
KR   20110098531 A    9/2011
(Continued)

OTHER PUBLICATIONS

Non-Final Office Action for U.S. Appl. No. 12/894,698, dated May 14, 2018, 41 pages.
(Continued)

*Primary Examiner* — Anthony D Brown
(74) *Attorney, Agent, or Firm* — Han Santos, PLLC; Daniel J. Stanger

(57) ABSTRACT

Data may be stored across the clouds of multiple cloud computing providers to improve data security. Software infrastructure components of an original cloud computing provider storing data via a first virtual machine (VM) may be identified. Software infrastructure components of an alternative cloud computing provider that is to store the data via a second VM may also be identified. A comparison is performed to determine components missing from the alternative cloud computing provider. Accordingly, configuration data may be created to cause a VM configuration utility to provision the second virtual machine with the missing components at a runtime of the second virtual machine. The configuration data and a command to activate creation of the second virtual machine on a cloud of the alternative cloud computing provider is sent to the VM configuration utility. Subsequently, a backup or a transfer of the data from the first virtual machine to the second virtual machine may be initiated.

19 Claims, 16 Drawing Sheets

Related U.S. Application Data which is a continuation-in-part of application No. 12/637,685, filed on Dec. 14, 2009, now Pat. No. 8,311,983.

(60) Provisional application No. 61/173,459, filed on Apr. 28, 2009.

(51) Int. Cl.

| | | |
|---|---|---|
| *G06F 21/62* | (2013.01) | |
| *G06F 9/455* | (2018.01) | |
| *H04L 29/08* | (2006.01) | |

(52) U.S. Cl.
CPC ............... *H04L 67/1097* (2013.01); *G06F 2009/45583* (2013.01); *G06F 2009/45595* (2013.01); *G06F 2201/84* (2013.01)

(58) Field of Classification Search
USPC .......................................................... 726/12
See application file for complete search history.

(56) References Cited

U.S. PATENT DOCUMENTS

| | | | |
|---|---|---|---|
| 6,529,484 B1 | 3/2003 | Quinquis et al. | |
| 6,975,346 B2 | 12/2005 | Kumhyr | |
| 7,046,273 B2 | 5/2006 | Suzuki | |
| 7,047,359 B1* | 5/2006 | Van Krevelen | G06F 11/2087 711/114 |
| 7,091,852 B2 | 8/2006 | Mason et al. | |
| 7,171,567 B1 | 1/2007 | Bayer et al. | |
| 7,173,526 B1 | 2/2007 | Monroe | |
| 7,302,481 B1 | 11/2007 | Wilson | |
| 7,460,521 B2 | 12/2008 | Son | |
| 7,612,680 B2 | 11/2009 | Eubank et al. | |
| 7,782,363 B2 | 8/2010 | Ortiz | |
| 7,872,593 B1 | 1/2011 | Rauscher et al. | |
| 7,917,617 B1* | 3/2011 | Ponnapur | G06F 9/45558 709/224 |
| 7,925,284 B2 | 4/2011 | Stubbs | |
| 8,065,325 B2 | 11/2011 | Crossley et al. | |
| 8,645,579 B2 | 2/2014 | Young et al. | |
| 8,665,087 B2 | 3/2014 | Greene et al. | |
| 8,818,829 B2 | 8/2014 | Delia et al. | |
| 9,374,460 B2 | 6/2016 | Nath et al. | |
| 2001/0005889 A1* | 6/2001 | Albrecht | G06F 21/56 726/24 |
| 2002/0188522 A1 | 12/2002 | McCall et al. | |
| 2003/0020816 A1 | 1/2003 | Hunter et al. | |
| 2003/0085989 A1 | 5/2003 | Tay | |
| 2003/0217287 A1 | 11/2003 | Kruglenko | |
| 2004/0002188 A1 | 1/2004 | Chung | |
| 2004/0021888 A1 | 2/2004 | Chang | |
| 2004/0024644 A1 | 2/2004 | Gui et al. | |
| 2004/0051741 A1 | 3/2004 | Venturino | |
| 2004/0101178 A1 | 5/2004 | Fedorovskaya et al. | |
| 2004/0126038 A1 | 7/2004 | Aublant et al. | |
| 2004/0146272 A1 | 7/2004 | Kessel et al. | |
| 2004/0155960 A1 | 8/2004 | Wren et al. | |
| 2004/0217884 A1 | 11/2004 | Samadani et al. | |
| 2004/0263314 A1 | 12/2004 | Dorai et al. | |
| 2005/0054381 A1 | 3/2005 | Lee et al. | |
| 2005/0058108 A1 | 3/2005 | Ekberg et al. | |
| 2005/0073575 A1 | 4/2005 | Thacher et al. | |
| 2005/0080800 A1 | 4/2005 | Parupudi et al. | |
| 2005/0101334 A1 | 5/2005 | Brown et al. | |
| 2005/0118983 A1 | 6/2005 | Camp | |
| 2005/0132348 A1 | 6/2005 | Meulemans et al. | |
| 2005/0168574 A1 | 8/2005 | Lipton et al. | |
| 2005/0216193 A1 | 9/2005 | Dorfman et al. | |
| 2005/0258942 A1 | 11/2005 | Manasseh et al. | |
| 2005/0278703 A1* | 12/2005 | Lo | G06F 11/0709 717/126 |
| 2006/0004579 A1 | 1/2006 | Claudatos et al. | |
| 2006/0072014 A1 | 4/2006 | Geng et al. | |
| 2006/0092043 A1 | 5/2006 | Lagassey | |
| 2006/0165040 A1 | 7/2006 | Rathod et al. | |
| 2006/0182055 A1 | 8/2006 | Coffee et al. | |
| 2006/0224797 A1 | 10/2006 | Parish et al. | |
| 2006/0234758 A1 | 10/2006 | Parupudi et al. | |
| 2006/0274829 A1 | 12/2006 | Siemens et al. | |
| 2007/0033265 A1 | 2/2007 | Anderson et al. | |
| 2007/0143357 A1 | 6/2007 | Chaudhri | |
| 2007/0173266 A1 | 7/2007 | Barnes | |
| 2007/0177606 A1 | 8/2007 | Jabri et al. | |
| 2007/0177616 A1 | 8/2007 | Jabri et al. | |
| 2007/0201391 A1 | 8/2007 | Belmonte et al. | |
| 2007/0208776 A1 | 9/2007 | Perry et al. | |
| 2007/0255618 A1 | 11/2007 | Meerbergen et al. | |
| 2007/0268367 A1 | 11/2007 | Agmon | |
| 2007/0268392 A1 | 11/2007 | Paalasmaa et al. | |
| 2007/0291303 A1 | 12/2007 | Tanaka et al. | |
| 2008/0005116 A1 | 1/2008 | Uno | |
| 2008/0020803 A1 | 1/2008 | Rios et al. | |
| 2008/0031426 A1 | 2/2008 | Weeks | |
| 2008/0032739 A1 | 2/2008 | Hoodbhoy et al. | |
| 2008/0052628 A1 | 2/2008 | Bugenhagen et al. | |
| 2008/0059989 A1 | 3/2008 | O'Connor et al. | |
| 2008/0182587 A1 | 7/2008 | Bennett | |
| 2008/0187181 A1 | 8/2008 | Meadow et al. | |
| 2008/0189789 A1 | 8/2008 | Lamontagne | |
| 2008/0207137 A1 | 8/2008 | Maharajh et al. | |
| 2008/0209067 A1 | 8/2008 | John et al. | |
| 2008/0218335 A1 | 9/2008 | Attar | |
| 2008/0231460 A1 | 9/2008 | Owen et al. | |
| 2008/0250328 A1 | 10/2008 | Konttinen | |
| 2008/0252485 A1 | 10/2008 | Lagassey | |
| 2008/0280637 A1 | 11/2008 | Shaffer et al. | |
| 2008/0301757 A1 | 12/2008 | Demarest et al. | |
| 2008/0303902 A1 | 12/2008 | Romer et al. | |
| 2009/0002157 A1 | 1/2009 | Donovan et al. | |
| 2009/0006336 A1 | 1/2009 | Forstall et al. | |
| 2009/0015672 A1 | 1/2009 | Clapp | |
| 2009/0049004 A1 | 2/2009 | Nurminen et al. | |
| 2009/0054029 A1 | 2/2009 | Hogberg et al. | |
| 2009/0063419 A1 | 3/2009 | Nurminen et al. | |
| 2009/0067586 A1 | 3/2009 | Fano et al. | |
| 2009/0070761 A1* | 3/2009 | Zhao | G06F 9/45558 718/1 |
| 2009/0083121 A1 | 3/2009 | Angell et al. | |
| 2009/0087161 A1 | 4/2009 | Roberts et al. | |
| 2009/0089294 A1 | 4/2009 | Davis et al. | |
| 2009/0094527 A1 | 4/2009 | Parupudi et al. | |
| 2009/0186596 A1 | 7/2009 | Kaltsukis | |
| 2009/0204885 A1 | 8/2009 | Ellsworth et al. | |
| 2009/0207852 A1 | 8/2009 | Greene et al. | |
| 2009/0252134 A1 | 10/2009 | Schlicht et al. | |
| 2009/0280784 A1 | 11/2009 | Mousseau et al. | |
| 2009/0284348 A1 | 11/2009 | Pfeffer | |
| 2009/0322874 A1 | 12/2009 | Knutson et al. | |
| 2010/0009700 A1 | 1/2010 | Camp et al. | |
| 2010/0058049 A1* | 3/2010 | Fein | H04L 63/04 713/150 |
| 2010/0063670 A1 | 3/2010 | Brzezinski et al. | |
| 2010/0090827 A1 | 4/2010 | Gehrke et al. | |
| 2010/0157061 A1 | 6/2010 | Katsman et al. | |
| 2010/0178025 A1 | 7/2010 | Bhogal et al. | |
| 2010/0182145 A1 | 7/2010 | Ungari | |
| 2010/0207787 A1 | 8/2010 | Catten et al. | |
| 2010/0211575 A1 | 8/2010 | Collins et al. | |
| 2010/0231714 A1 | 9/2010 | Flores et al. | |
| 2010/0235891 A1 | 9/2010 | Oglesbee et al. | |
| 2010/0262582 A1 | 10/2010 | Garcia-Ascanio et al. | |
| 2010/0274816 A1 | 10/2010 | Guzik | |
| 2010/0312817 A1 | 12/2010 | Steakley | |
| 2010/0321183 A1 | 12/2010 | Donovan et al. | |
| 2010/0332131 A1 | 12/2010 | Horvitz et al. | |
| 2011/0018998 A1 | 1/2011 | Guzik | |
| 2011/0060520 A1 | 3/2011 | Heo et al. | |
| 2011/0069172 A1 | 3/2011 | Hazzani | |
| 2011/0082940 A1 | 4/2011 | Montemurro et al. | |
| 2011/0227728 A1 | 9/2011 | Mathis | |
| 2011/0302130 A1 | 12/2011 | Lee et al. | |

(56) References Cited

U.S. PATENT DOCUMENTS

| | | | |
|---|---|---|---|
| 2012/0042162 A1 | 2/2012 | Anglin et al. |
| 2012/0110135 A1 | 5/2012 | Sparks |
| 2012/0203742 A1 | 8/2012 | Goodman et al. |
| 2012/0303736 A1 | 11/2012 | Novotny et al. |
| 2012/0330887 A1 | 12/2012 | Young et al. |
| 2014/0096134 A1 | 4/2014 | Barak et al. |
| 2014/0237016 A1 | 8/2014 | Diwakar |
| 2015/0381736 A1 | 12/2015 | Seltzer et al. |

FOREIGN PATENT DOCUMENTS

| | | | |
|---|---|---|---|
| WO | 2004042673 A2 | 5/2004 |
| WO | 2008008448 A2 | 1/2008 |
| WO | 2007082166 A3 | 4/2008 |
| WO | 2008045003 A1 | 4/2008 |

OTHER PUBLICATIONS

Final Office Action for U.S. Appl. No. 14/826,140, dated Apr. 3, 2018, 40 pages.
Non-Final Office Action for U.S. Appl. No. 14/826,140, dated Jan. 24, 2018, 50 pages.
International Search Report & Written Opinion dated Oct. 24, 2017 for PCT Application No. PCT/US2017/039908, 11 pages.
ESRI, "Public Safety and Homeland Security Situational Awareness," Feb. 2008.
V. Ghini et al., "Mobile E-Witness," Jul. 19, 2007.
Non-Final Office Action dated Sep. 26, 2011, for U.S. Appl. No. 12/637,685, 19 pages.
Final Office Action dated Mar. 27, 2012, for U.S. Appl. No. 12/637,685, 22 pages.
Notice of Allowance dated Jul. 5, 2012, for U.S. Appl. No. 12/637,685, 11 pages.
Non-Final Office Action dated May 8, 2013, for U.S. Appl. No. 12/894,698, 28 pages.
Final Office Action dated Dec. 30, 2013, for U.S. Appl. No. 12/894,698, 33 pages.
Final Office Action dated Jan. 11, 2014, for U.S. Appl. No. 12/894,698, 33 pages.
Non-Final Office Action dated Aug. 15, 2014, for U.S. Appl. No. 12/894,698, 33 pages.
Final Office Action dated Jan. 15, 2015, for U.S. Appl. No. 12/894,698, 38 pages.
Non-Final Office Action dated Sep. 24, 2015, for U.S. Appl. No. 12/894,698, 45 pages.
Final Office Action dated Apr. 26, 2016, for U.S. Appl. No. 12/894,698, 54 pages.
Non-Final Office Action dated Jul. 13, 2016, for U.S. Appl. No. 12/894,698, 48 pages.
Final Office Action dated Jan. 27, 2017, for U.S. Appl. No. 12/894,698, 40 pages.
Non-Final Office Action dated Jul. 31, 2013, for U.S. Appl. No. 13/646,677, 5 pages.
Final Office Action dated Jul. 18, 2014, for U.S. Appl. No. 12/646,677, 17 pages.
Non-Final Office Action dated Apr. 28, 2015, for U.S. Appl. No. 12/646,677, 16 pages.
Notice of Allowance dated Sep. 23, 2015, for U.S. Appl. No. 13/646,677, 15 pages.
Non-Final Office Action dated Oct. 22, 2014, for U.S. Appl. No. 13/653,372, 21 pages.
Final Office Action dated Mar. 12, 2015, for U.S. Appl. No. 13/653,372, 25 pages.
Non-Final Office Action dated Jun. 26, 2015, for U.S. Appl. No. 13/653,372, 29 pages.
Final Office Action dated Dec. 21, 2015, for U.S. Appl. No. 13/653,372, 30 pages.
Non-Final Office Action dated May 18, 2016, for U.S. Appl. No. 13/653,372, 29 pages.
Final Office Action dated Oct. 18, 2016, for U.S. Appl. No. 13/653,372, 34 pages.
Non-Final Office Action dated Mar. 6, 2017, for U.S. Appl. No. 13/653,372, 36 pages.
International Search Report and Written Opinion dated Feb. 28, 2013, for PCT International Patent Application No. PCT/US20012/060521,13 pages.
Extended Search Report dated Apr. 19, 2013, for European Patent Application No. 09844205.6, 13 pages.
Office Action/Examination Report dated Sep. 27, 2013, for Canadian Patent Application No. 2,759,871, 3 pages.
U.S. Appl. No. 12/894,698, Final Office Action dated Nov. 20, 2018, 37 pages.
U.S. Appl. No. 12/894,698, Non Final Office Action dated Oct. 13, 2017, 93 pages.
U.S. Appl. No. 13/646,677, Notice of Allowance dated Sep. 23, 2015, 35 pages.
U.S. Appl. No. 14/826,140, Non Final Office Action dated Sep. 5, 2018, 33 pages.
U.S. Appl. No. 12/637,685, Notice of Allowance dated Jul. 5, 2012, 11 pages.
U.S. Appl. No. 15/376,623, Non Final Office Action dated Oct. 17, 2019, 53 pages.

* cited by examiner

DATA BACKUP AND TRANSFER ACROSS MULTIPLE CLOUD COMPUTING PROVIDERS

CROSS REFERENCE TO RELATED PATENT APPLICATIONS

This application is a continuation-in-part of U.S. patent application Ser. No. 12/894,698, entitled "Correlated Media Source Management and Response Control," filed on Sep. 30, 2010, which is a continuation-in-part of U.S. patent application Ser. No. 12/637,685, entitled "Correlated Media for Distributed Sources," filed on Dec. 14, 2009, and claims priority to U.S. Provisional Patent Application No. 61/173,459, entitled "Presenting Combinations of Correlated Media for Distributed Sources," filed on Apr. 28, 2009. The above listed patent applications are incorporated herein by reference.

TECHNICAL FIELD OF THE SUBJECT MATTER

This subject matter of the present application relates to aggregating and correlating distributed media.

BACKGROUND OF THE SUBJECT MATTER

Media data comes in many forms including, but not limited to, video, audio, still images, and text. Presently, media data is captured, that is recorded, and stored on a storage media that is dependent on the form of media data. For example, video is captured by video cameras, audio is captured via microphone and recorders, and still images are captured by cameras.

Currently, video cameras and digital recorders are used for a wide range of applications. While the use of video cameras and digital recorders is typically associated with personal events. There are many applications of the use such devices for commercial purposes including security and surveillance. For example, police car video cameras are used to record stop encounters.

As described above, more than one form of media may be used to capture an event. For example, a security camera and a digital audio recorder may capture both video and audio data respectively from a crime scene. Afterwards, a police officer or security supervisor may add text captions to the video using computer-based software or on-camera functions. Combining different forms of media for presentation is termed multimedia, and accordingly there may be multimedia capture of security events and crime scenes.

Presently, captured media is most commonly stored as digital data, thereby becoming a data asset. Digital data assets may be streamed to users or consuming devices in real time, or may be captured and later transported as a file for streaming.

The consumer electronics revolution has made digital video cameras, digital still cameras, and digital recorders ubiquitous. Accordingly, commoditized video cameras and digital recorders have become available for security applications. Digitization and miniaturization has led to the production of video cameras that can fit in a mobile phone with ever improving resolution. Further, the advent of commoditized compact memory has enabled large amounts of video data to be stored in such devices, in a cost effective manner. As of this writing, 16 gigabytes (GB) of storage space can store 40 hours of video data with average resolution. Accordingly, large amounts of digital data assets may be captured from many different sources and in many different media. Furthermore, the individuals that capture a security event or crime scene with a camera or recorder need not necessarily be related. For example, at a crime scene, there may be surveillance cameras that were stationed in the area long before the scene; there may be police officers with mobile cameras and recorders, and another police officer taking still shots with a digital camera.

With the Internet, digital data assets may be shared in both edited and non-edited form. In the past, files were shared simply by transferring peer-to-peer, such as e-mailing files or uploading to a LAN based server. Later, digital data assets were posted and distributed via web pages via internet protocols. Currently police officers and security personnel can post and distribute digital data assets to a centralized location via web services, with facilities to search and tag on posted assets. In this way, different recordings of the same crime scene might be aggregated to help solve a crime case, regardless of who originally captured or uploaded the digital asset.

In general, there is presently a critical mass of digital data assets that can be correlated and combined together. For example, panoramic software can stitch together different still photos taken at the same time of the same event and result into a single photo. Different video and audio feeds may be mixed together to make a composite rendering. However, such efforts are typically manual in nature and use relatively short media clips.

At present, automating the correlation and combination of multimedia of relatively large long data assets, such as those hundreds or thousands of hours in length is not done. Moreover, recording metadata to aid in correlating the data assets with other data assets is not presently done. Finally, using such correlating metadata to automate correlations of data assets into a combination presentation is not presently done.

SUMMARY OF THE SUBJECT MATTER

The embodiments described herein relate to a comprehensive system to store data assets, associate correlating metadata, share data assets in either a peer to peer manner or via a web service or equivalent, retrieve data assets, and present data assets either singularly or in various combinations.

Method embodiments described herein may include associating an identifier along with correlating metadata such as date/timestamp and location. The identifier may then be used to associate data assets that are related to a particular incident. The identifier may be used as a group identifier on a web service or equivalent to promote sharing of related data assets. Additional metadata may be provided along with commentary and annotations. The data assets may be further edited and post processed. The data assets may be then presented either singularly or in various combinations, either locally or in a custom application. A custom application may be hosted at a network operation center as well with capabilities of directing collection of data assets.

System embodiments described herein may include a mobile client that is based on a modified cell phone. The mobile client may include video cameras and other media recording capabilities, location service functionality such as global positioning system (GPS) functionality, and full networking capabilities. The mobile client may also support a preview mode by which the video camera captures not only an incident at the time of recording starting, but also several seconds of video preceding the event as stored in a preview buffer. The mobile client may further include a custom charger in the form of inductance coils and a file manager that provides file system capabilities specific to a mobile device. Even further, the mobile client may include a tamper proof chassis and optional features for physical secure storage.

The mobile client hardware may be exposed to application software via an eventing system that allows programmers to add event handlers for custom software events. The system as disclosed may also include end to end applications covering use of external advertising and annotations and tools.

BRIEF DESCRIPTION OF THE DRAWINGS

Non-limiting and non-exhaustive examples are described with reference to the following figures. In the figures, the left-most digit(s) of a reference number identifies the Fig. in which the reference number first appears. The use of the same reference numbers in different figures indicates similar or identical items or features.

DETAILED DESCRIPTION OF THE PREFERRED EMBODIMENT

Combining and Correlating Digital Data Assets

Figure 1:
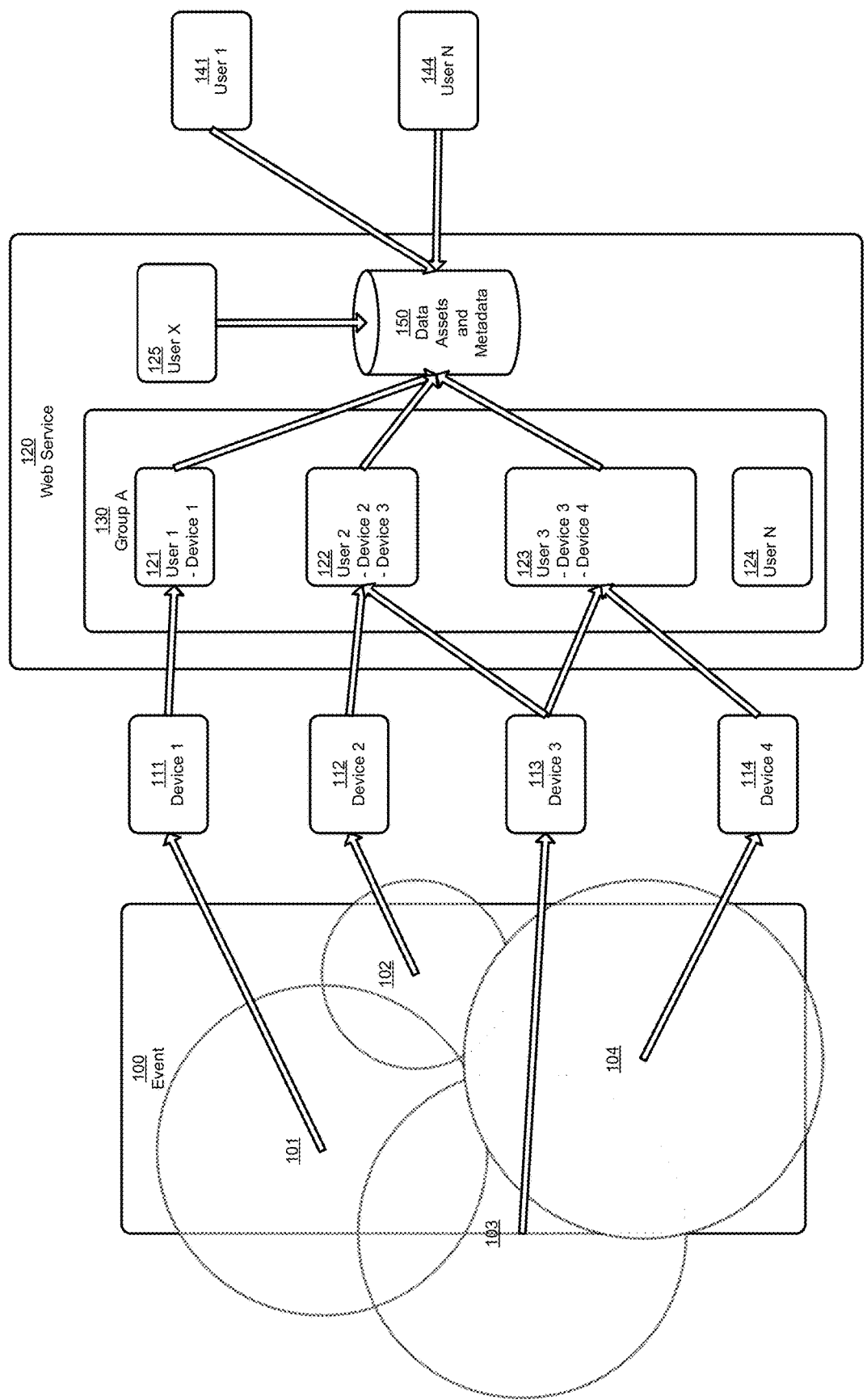
FIG. 1 is a diagrammatic illustration showing individual actors, hardware, and software in a web service embodiment of correlating media for distributed services.

The embodiments described herein pertain to methods, systems, and apparatuses for capturing digital media as data assets, associating correlating metadata with those assets, and retrieving and correlating data assets at least partially based on the correlating metadata. In this way, the task of correlating disparate data assets into a coherent combination may be automated.

There are many different types of combinations of data assets. Such combinations may be of similar media, as in making a panoramic composite photo by stitching together different digital photos. Further, such combinations may be of different media, such as adding a custom audio track to a video. Such combinations may even be of the same context, such as providing different views of the same police, fire and/or security incident. In extreme situations, different contexts may be combined such as with a mashup. Such combinations need not be composites and may be presented as various different correlated media assets displayed side by side, or as combined into an integrated whole.

To support automating such a varied range of combination presentations, the embodiments described herein allow a rich range of correlating metadata to be associated with a data asset. When two or more data assets are to be combined, as a composite or otherwise, the metadata may provide a referent by which each data asset may be correlated. Common metadata may include, but is not limited to, date/time stamp and location metadata.

For example, a video clip may have date/time information stored for each frame, and an audio clip may have date/time information stored for each track segment. The video clip and the audio clip may be combined into a multimedia presentation by correlating the date/time stamps of the two files. In this case the correlation is a synchronizing of the two files and the presentation is a composite of the two files. Of course, the number of such files that may be so combined is not limited to just two.

Correlation can be based on multiple metadata values. For example, multiple still photos might be stored not only with date/time stamp metadata, but also with location metadata, possibly from a global positioning satellite (GPS) stamp. A software tool that collects all stored still photos taken within a window of time, for example during a security or police response to a crime incident, and close to the scene of a crime, may combine the photos of the incident into a sequence of pictures with which for investigation purposes. Here the correlation is both by time and location, and the presentation is a non-composite simultaneous display of different data assets.

Correlating metadata can be based on a set of custom fields. For example, a set of video clips may be tagged with an incident name. Consider three field police officers each in a different city and in a different time zone, recording videos and taking pictures at exactly at midnight on New Year's Day 2013. Each officer might tag their videos and their still photos with "New Year's Day 2013 Security Watch". A software tool may collect all stored videos with that tag, and may further provide a presentation rotating between the videos and photos for the event. Here the correlation is made using a custom tag, is not specific either to time or location, and is a non-composite display of different data assets.

This degree of flexibility means that correlations can be both by absolute referent and by relative referent. Most incidents occur at an absolute time and location, and incidents may occur at different locations (such as a bank robbery occurring at a bank, and a breaking and entering at a power main to shut off the power to enable the robbery). Another example would be the security of an event over multiple locations such as the election or Olympics which are held at different venues in a city or different cities. In other situations, incidents, such as a high speed chase may span multiple counties. The above is a correlating example of synchronizing video and audio by means of a relative referent, whereby the time stamp need not be of absolute time, but could potentially be synchronized to the beginning of the data clips. The above example of the New Year's Day event is an extreme example of correlating by a relative referent. The "New Year's Day 2013 Security" tag is arbitrary, and correlates data assets without regard to traditionally absolute referents of date/time and location. This example is also known as date/time shifting and location shifting.

Exemplary Platform for Correlating and Combining Data Assets

Figure 2:
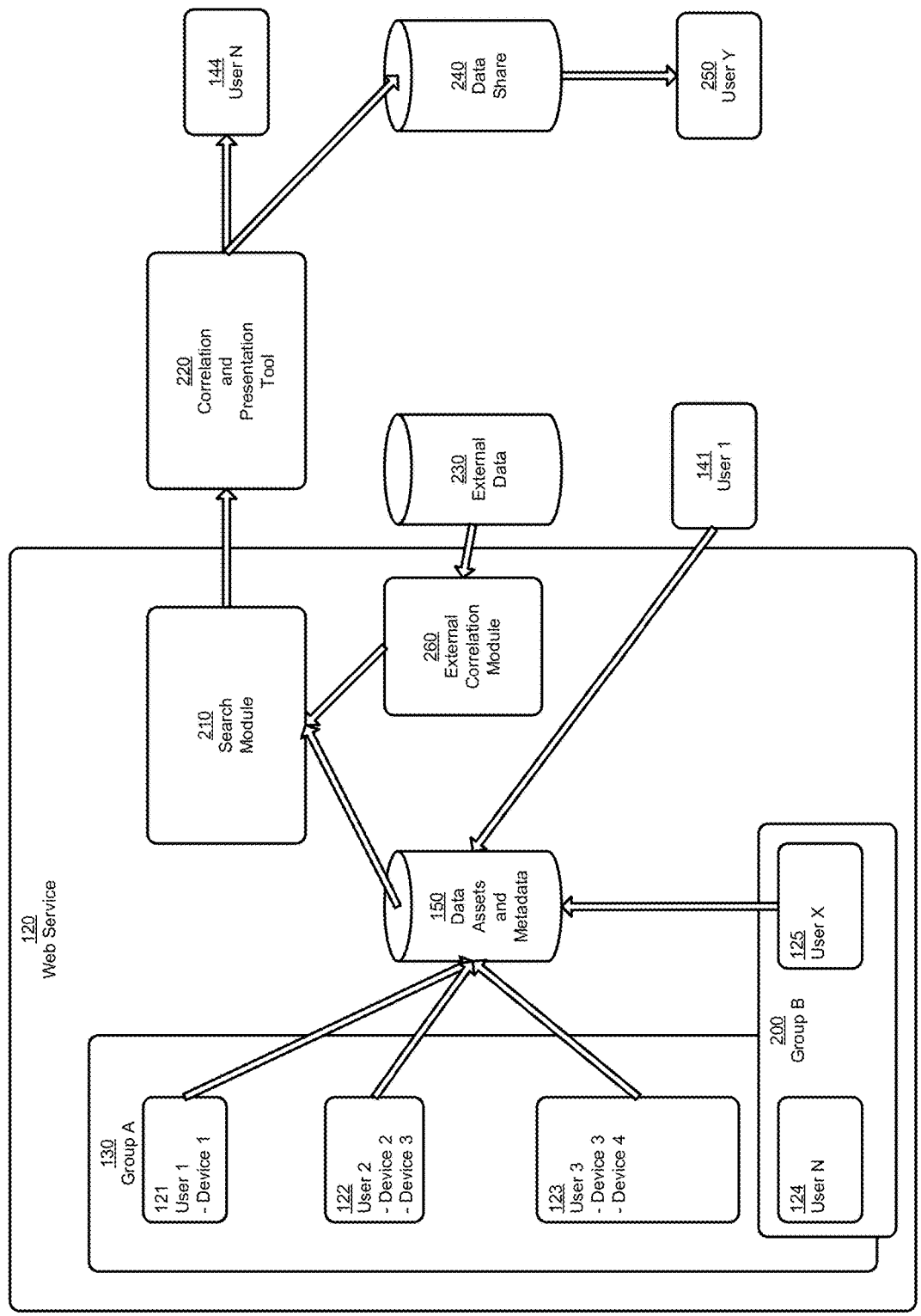
FIG. 2 is a diagrammatic illustration showing individual actors, hardware, and software for sharing and correlating data assets in accordance with a web service embodiment of correlating media for distributed services.

FIGS. 1 and 2 illustrate an exemplary platform for correlating and combining data. FIG. 1 illustrates capture of data. FIG. 2 illustrates presentation of data.

In this exemplary platform, event 100 is to be captured by recording devices 111-114 each of which is to capture some part of event 100 as represented by scopes 101-104, respectively. The data captured by the respective scopes 101-104 may be uploaded in the form of files to a web service 120 by users with accounts 121-123 that can transfer files from their respective devices 111-114. The web service 120 groups users into groups, e.g., users with accounts 121-124 belong to group 130. Note that device 113 can be associated with multiple user accounts 122 and 123. Note that the user with account 124 does not have a device but can still participate in a group. The users thus organized can store the data assets into a central storage 150. The user with account 125 which does not belong to group 130 may potentially belong to any number of other groups on the web service, or alternatively may join group 130. The user with account 125 may have devices (not shown) and upload to the central storage 150. Users 141 and 144, with accounts 121 and 124 respectively, may log on later to tag, comment, annotate, or otherwise associate metadata with the uploaded files. The following discussion describes this configuration in more detail.

Event 100 may represent the capture of any set of media data. Usually an event consists of a discrete real-world event such as a crime incident. However, some users may wish to combine different events in different locales and time zones. These different events may not even have any context in common, save for a user's preferences. For example, a police supervisor may be looking for patterns of assaults in a jurisdiction. Each individual assault was perpetrated independently, but studying the aggregate data, the police supervisor may detect areas of high risk.

An event can be captured by one of many commonly available devices 111-114. Exemplary devices include, but are not limited, to video cameras, digital audio recorders, or digital still cameras. Another example of a recording device might be a laptop that stores GPS samples or other location service samples to track location. Devices 111-114 may record data in analog format but then convert the data to digital format later for sharing. Devices 111-114 may further have the capability of capturing different types of media at the same time. For example, a video recorder usually captures video and audio at the same time. Alternatively, many digital cameras support both video and still modes of capture. Notwithstanding the many features of present day devices, usually a single device at best can only capture a subset of an event as represented by scopes 101-104. Each scope only covers a subset, but a combination of the scopes may provide a more complete capture of the event.

Devices 111-114 may generally store captured media either as files or stream the captured media to a remote device that will persist the data. Eventually the captured media may be stored as a digital data asset, usually as a file. In the alternative, data may be persisted on analog tape.

Devices 111-114 may have the ability to associate metadata either before capture or at time of capture. For example the respective devices may provide for a user to provide a default tag for all files such as camera identifier (ID). During capture, the respective devices may store data/time stamp information or location service tracking location data such as GPS with the file.

An example of a default tag associated before time of capture is an Event ID (also called a Pounce™ ID) that may be used to indicate which files are candidates for correlating for an event. Generally an Event ID corresponds to a unique event. The end to end process is discussed in the context of FIG. 4. Metadata association is discussed in more detail below in the context of FIG. 5.

In the exemplary platform in FIG. 1, each device 111-114 belongs to at least one user (not shown), and each user has an account 121-123. In the case where data is being shared peer to peer, accounts may not be necessary since devices 111-114 may access each other without the need for intermediate storage and because the user is operating only one device. However, in the FIG. 1 exemplary platform, note that the user associated with account 123 is operating both devices 113 and 114. Further note that devices 111-114 need not have been operated at the same time. For example, a user might record video in a police car on a device for an incident and on a separate device record video and/or audio that may or may not begin or end at the same time.

Accounts 121-124 may be aggregated on web service as 120 as a group 130. As a default, a group may be identified to include all users with data files with the same Event ID. A group may also be either a predefined or a self selecting group, for example a set belonging to a security agency, or a set of all police officers belonging to the homicide division, or even a set of officers seeking to share data regardless if they bellowing to an organized or unorganized group. A group may also be related to some other grouping external from the web service, e.g., a law enforcement Case ID seeking all data assets that might have captured an event such as a crime in progress.

In this exemplary platform, users with accounts associated with devices 111-114 then may upload files to central storage 150. Users may belong to zero, one, or more groups. An example of where a user belongs to zero groups is includes a user having initially established an account, although an alternative embodiment may include a user creating a default group. An example of a user belonging to multiple groups includes a video file belonging both to a group to capture a security event and to a group showing what other security personnel were doing on a given day.

Users with accounts in a group may also have the ability to add metadata after capture of the media data. As illustrated by users 141 and 144, adding metadata may include, but is not limited to, commenting on files by manually adding meta data or by automation, such as tagging, which may be performed via software tools and by scripting.

Users with accounts are not limited to associating data assets with metadata. Users with accounts in a group also have the ability to edit the data assets directly. For example, a still photo may be uploaded and later cropped using a digital photo editor. The editor may be provided as on-line tool as part of the web service or, alternatively, may be provided as desktop software by which the user may download the file, edit, and re-upload the edited file.

User account 124 pertains to a user who is not associated with a device. In general, user accounts may be associated with zero, one, or more devices. Because users can add metadata after capture, a user may still participate in a group without being responsible for providing data assets to the group. This is a common scenario for master editors as well as mixers who use data assets as samples.

In this exemplary platform embodiment, the result is a central store 150 of data assets that have been associated with correlating metadata from before, during, and after time of capture. At least some subset of the metadata may be used for correlation.

FIG. 2 includes references to features first introduced with reference to FIG. 1 to continue discussion of this exemplary platform embodiment. Central store 150 may be accessed by external users for metadata inclusion and final presentation. An external user 144 may access correlation and presentation tool 220 that translates user 144's operation into a query performed by search module 210. At least some of the query criteria may be based on correlating metadata. The search module 210 may retrieve data assets, from central store 150, that match the criteria of the query. Additionally the search module 210 may retrieve external data sources. The search module 210 may forward query criteria to an external correlation module 260, which retrieves data assets from an external data store 230 and associates the necessary correlation metadata with the data assets. Examples of external data include, but are not limited to, map data and to advertising data. External data may be retrieved by the search module 210 along with data assets from central store 150. The search module 210 may then return the combined data to the correlation and presentation tool 220. Accordingly, additional correlations may be made, others correlations removed, and the data assets may be presented side by side, in rotation, or potentially in composite form to user 144. A final presentation may be saved as a single file or single distribution, and persisted on data store 240 where it may then be viewed by other users 250, regardless of affiliation with a group or from the web service. The following discussion describes this process in more detail.

The correlation and presentation tool 220 is represented as a single entity. However, correlation and presentation may be implemented in different modules, for example as different dynamic link libraries (DLLs) within a single application or as separate plug-ins from a browser. The correlation and presentation tool 220 may have a query tool (not shown) that provides for simple queries, e.g., retrieve all data assets relating to "New Year's Day 2013 Security Watch." Alternatively, the tool may provide the back end infrastructure for a domain specific application such as a law enforcement dispatch tool. Several such applications, including applications for law enforcement and for transportation are discussed below.

The correlation and presentation tool 220 may invoke search module 210 in the form of a query. The query may be a SQL query that retrieves data assets according to a series of where clauses. For example in the following SQL pseudo-code:

```
select data_asset_id
from data_asset_table, group_table
where data_asset_table.group_id = group_table.group_id
and group_id = [group_id]
and data_asset_table.date_time_stamp = [date_time_stamp]
``` the correlation and presentation tool 220 may retrieve all data asset identifiers in a specified group at a particular time. In the alternative, the query may simply be a parameterized DLL call invocation as in, for example, the following function declaration pseudo-code:

ReturnDataAssetByTimeStamp([group_id], [date_time_stamp]).

In addition to filtering and correlating via predefined fields, the embodiments described herein may support filtering on custom metadata. One option to support custom metadata is to support a number of custom fields within a relational database. In this way, a simple text comparison may return all data assets when a custom tag equals, e.g., "New Year's Day 2013 Security Watch." In the alternative, some relational databases may support stored procedures that can invoke binaries. For example, Microsoft SQL Server™ allows invocation of COM object and Oracle 10G™ allows invocation of Java™ objects.

In the above examples, the actual binary to execute the queries is the search module 210. The search module may not only invoke data assets in the central store 150, but also zero, one, or more external databases 230 via the external correlation module 260. Example external databases may store, as examples only, mapping data, advertising data assets, domain data such as public Securities and Exchange Commission (SEC) filing data, or integration with other applications such as law enforcement case management databases. At this stage, correlations may occur in the form of join statements in SQL, or binary equivalents.

The external correlation module 260 may be responsible for returning data assets from the external database 230 along with correlation metadata. The data assets may be returned with at least an Event ID to allow general correlation with the other data assets returned from the central store 150. Any metadata that was captured before or during recording may be converted to a format correlatable with the data assets on the central store 150. For example, if a date-time stamp is in a different format, the external correlation module may convert the date-time stamp to the central store 150 format.

The external correlation module 260 may have access to multiple databases, so it may use one external database for data assets and another database for metadata. One example is a Joint Photographic Experts Group ("JPEG") file that has GPS information which is correlated with a geolocation advertising database that links ads specific to the JPEG's location.

When the search module 210 retrieves data assets and associated metadata, it may return the data to the correlation and presentation tool 220 optimally as a rowset. Specifically, it may return a binary enumerable set of rows in which each data row contains a data asset ID, an Event ID, related metadata and at least an accessible reference to the data asset so that the correlation and presentation tool 220 may actually retrieve the data asset. In the alternative, when a high bandwidth dedicated connection is available, the data assets may be served as a binary large object ("BLOB"). In the alternative to a rowset, the search module may return the data asset id, event id, metadata, and data asset reference as an eXtensible Markup Language ("XML") file.

Once at the correlation and presentation tool 220, the data assets may be further correlated for presentation. For example, once the data assets are local to the correlation and presentation tool 220, further filtering may be performed resulting in changing correlations. For example, when the rowset returns all data assets focusing on a particular crime incident, it may be possible to retrieve only the data assets focusing only on a particular person under surveillance. Because of the extent of possibilities, correlations may be driven by a custom rules engine.

The correlation and presentation tool 220 may further support displaying the data assets both simultaneously and as composite. One example of such displaying would be to have multiple synchronized videos of a security incident playing on small screens and providing a control to view images from a selected one of the small screens on a large screen. Another example would be to stitch together individual still images into a single composite. Yet another example would be to display a first video followed immediately by a second correlated video.

Composite presentations may require editing capabilities on the subject data assets. For example in stitching, the different JPEGs taken from different cameras and different locations will vary in shading, color filtering, and the like. Software post processing modules may be resident in the correlation and presentation tool 220 to apply digital photo processing to correct and homogenize the JPEGs to be stitched.

As a result of the correlation and presentation functions being integrated into the same tool 220, the correlation engine itself may be used to determine which data assets are to be post processed. For example, the correlation function may identify which JPEGs have an average darkness beyond a predetermined threshold. In the alternative, the correlation engine might calculate an average darkness and homogenize the images to that average. After post processing, the correlation and presentation tool 220 may be used to present the final presentation to the user 144. The user may apply other processing as desired.

The user 144 has the option of storing the final presentation as a single multimedia file or, in the alternative, as a single distribution of multiple files. The single file or distribution may be stored on an intermediate data store 240 where other users 250 may view or access. The intermediate data store 240 may be a networked share drive or a file server accessible via the web. In the alternative, it may be portable media such as a memory stick or DVD-ROM. Access to the data on the intermediate data store 240 may be encrypted or password protected.

In this exemplary platform embodiment, the result is a single multimedia file or single distribution that combines multiple data assets that have been correlated for consumption by a user.

Exemplary Peer to Peer Embodiment

Figure 3:
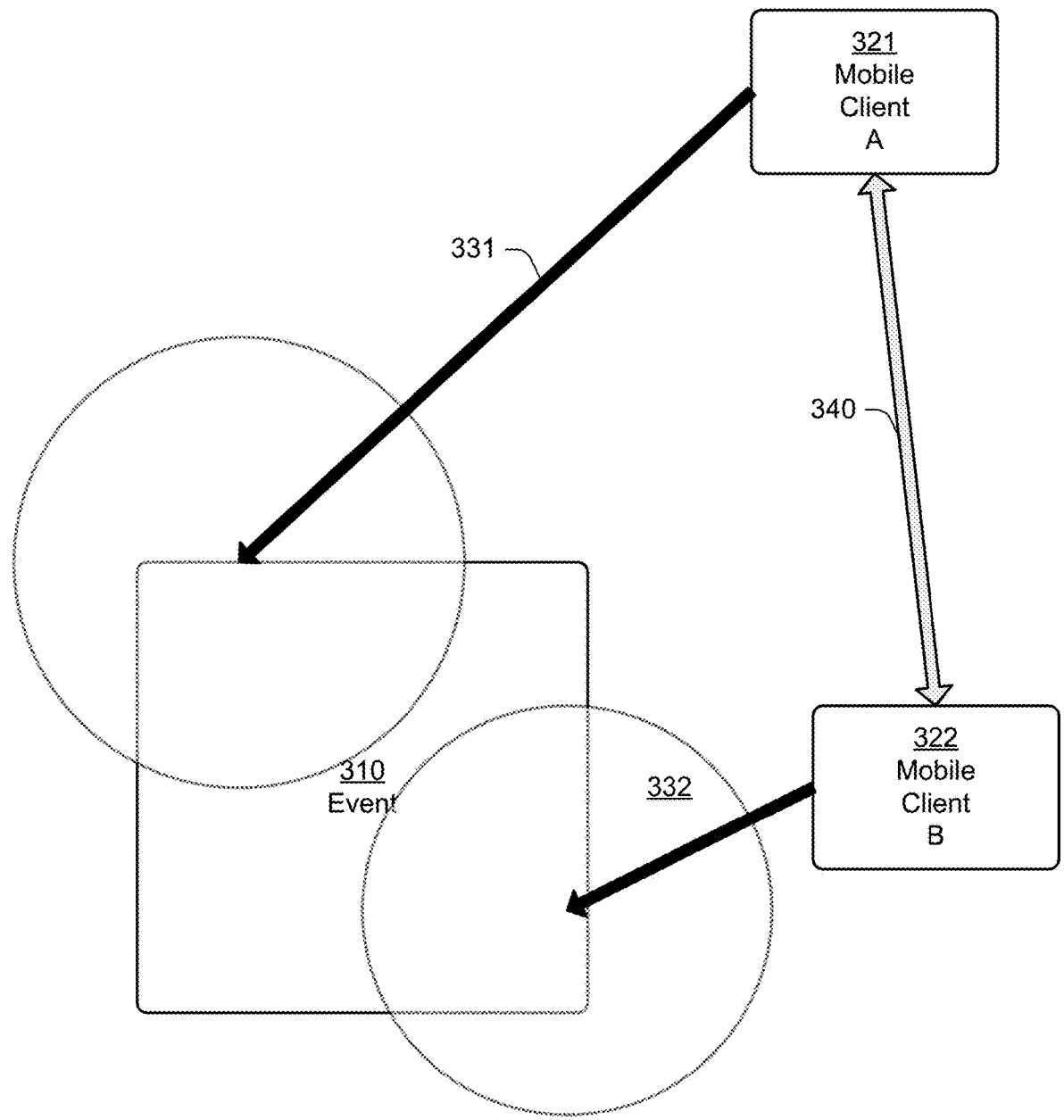
FIG. 3 is a diagrammatic illustration showing individual actors, hardware, and software for capturing an event, sharing data assets, and correlating the data assets into a final result. In a peer-to-peer embodiment of correlating media for distributed services.

FIG. 3 illustrates a peer to peer embodiment, whereas FIGS. 1 and 2 illustrate a web service centric embodiment. Event 310 may be captured by mobile clients 321 and 322, both configured in accordance with the embodiments described herein. Mobile client 321 may then capture a portion of event 310 via video recording 331. Mobile client 322 may similarly capture a portion of event 310 via video recording 332. During the recording, both mobile clients 321 and 322 may store metadata identifying the date/timestamp and location of the recording. Potentially each client may also store data assets with different date/timestamps and locations.

After the event is over, mobile client 321 and mobile client 322 may attempt to establish a peer to peer, mesh, LAN, or WLAN connection over the Infrared Data Association ("IRDA") protocol. Specifically, if mobile client 321 initiates, the mobile client may first generate an Event ID based on the mobile client's device number. The user of the mobile client may add additional metadata, e.g., the name of the event. Mobile client 321 may then send this metadata over to mobile client 322 via IRDA. When mobile client 322 sends an acknowledgement, a link 340 may be established. Henceforth, any data assets transferred over the link may be tagged with the Event ID and associated metadata.

Because this is a peer to peer collection, mobile clients 321 and 322 can enumerate each other's data assets. Mobile client 321 may enumerate all data assets on mobile client 322 taken near the GPS location of one of his video recordings taken at the event and around the times of the event. Then mobile client 321 may retrieve all those data assets. When the data assets are transferred, the data assets may be tagged with the Event ID and associated metadata. Mobile client 322 may similarly perform such an action to mobile client 321. After data transfer, either mobile client 321 or 322 or both may opt to terminate data connection 340.

Exemplary Correlation Method

Figure 4:
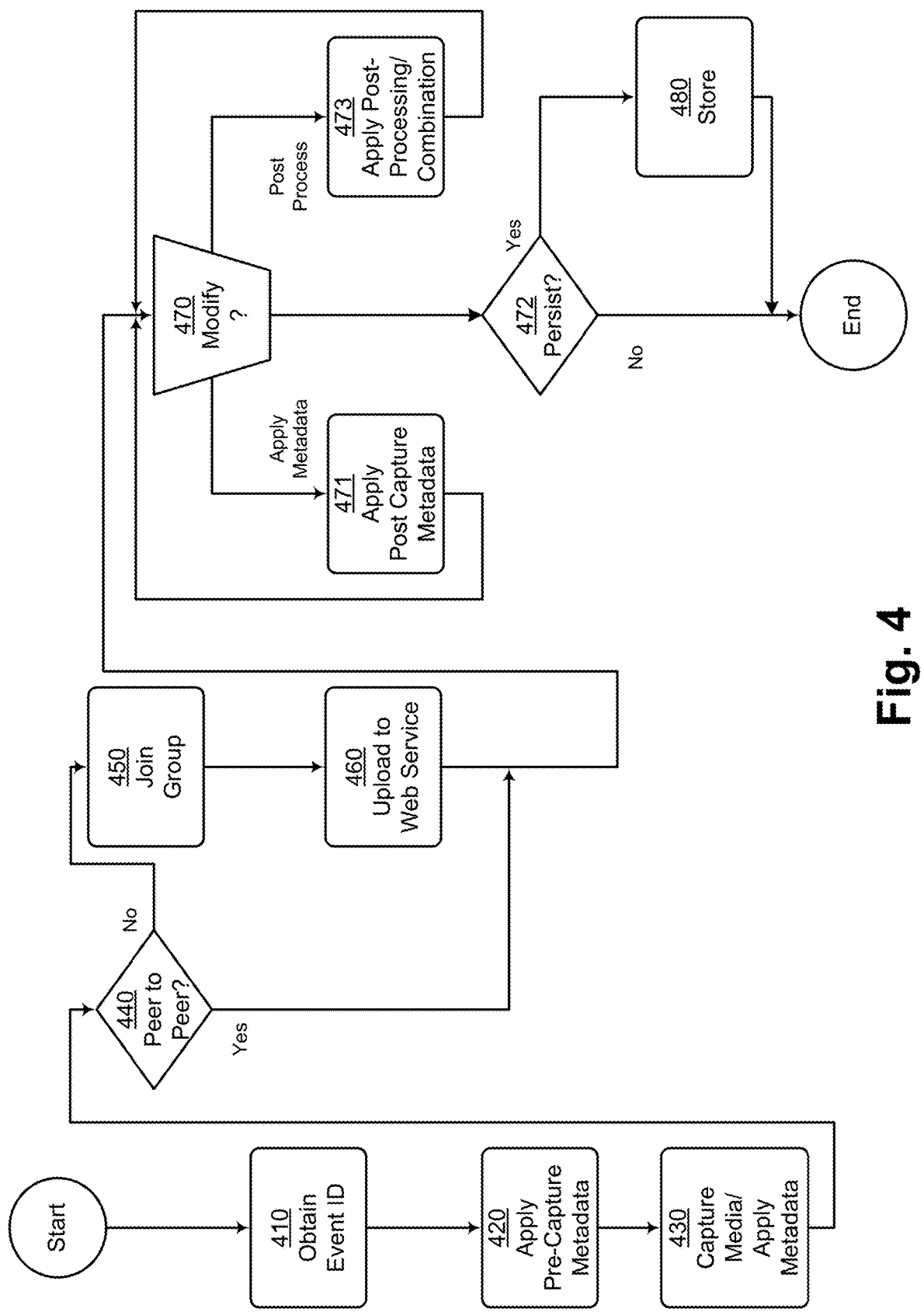
FIG. 4 is a flow diagram of an illustrative process for correlating media for distributed services.

FIG. 4 illustrates an exemplary method for correlating data assets regardless of platform. In step 410, an Event ID (also called a Pounce™ ID) may be obtained. This Event ID is provided as the minimal amount of metadata to correlate the resulting data asset with other data assets. Data assets with the same Event ID may be retrieved together. A data asset may eventually have more than one Event ID.

In step 420, correlation metadata prior to capturing the data asset may be applied. Correlation metadata may include, but is not limited to, the Event ID. Other correlation metadata may include the identity of the person capturing the data and a location stamp.

In step 430, data capture commences. During capture, correlating metadata may be captured along with the media. For example, GPS samples may track location during a mobile video recording in progress. Once recording is complete, at decision step 440 a decision is made if the resulting data asset is to be shared in place via a peer-to-peer connection or uploaded to a web service. If the data asset is to be uploaded to a web service, a group corresponding to the Event ID may have to be joined 450 and then uploaded to a central store 460 via the web service. Alternatively, if the data asset is to be shared in place, there is no need to upload the data.

In step 470, the data asset may be modified multiple times. In 471, additional metadata, correlating or otherwise may be applied. In step 473, the data asset may be post-processed. For example, if the uploaded data is a still JPEG, it may be cropped. Another example includes correlating the data asset with other data assets and integrating them together.

At decision step 472, a decision of whether to share the final data asset may be made. If the final data asset is to be shared, in step 480 the data asset may be stored in a memory different than central storage, such as a memory stick or a DVD-ROM, and the data asset may then be ready for distribution. Otherwise, the data asset remains in storage for further retrieval and other actions. The following discussion describes this process in more detail.

In step 410, the Event ID may be created in many different ways provided that the Event ID is sufficiently unique to identify one or more sets of data assets covering at least a portion of an event. Again, while an event may correspond to an actual real world event, for purposes of the embodiments described herein, an event may be a set of recordings that are to be collected together for any reason, real-world, artistic, or otherwise. For clients enabled with consumer software to create an Event ID (e.g., Pounce™ software), the Event ID may be a globally unique identifier ("GUID") generated by software such as guidgen.exe from Microsoft™. Alternatively, the Device ID of the capturing device may be used. On a cell phone if the transport is short message service ("SMS"), the SMS ID may be used as an Event ID. For yet another example, for Twitter™ based distribution, the PID plus additional supporting text may be used for an Event ID.

In step 420, pre-capture metadata is to be applied to the one or more sets of data assets. The metadata may include the Event ID as well as any metadata globally applicable to the one or more sets of data assets such as, but not limited to, name of the person capturing the event, date/time stamp, location, and device type. The pre-capture metadata preferentially is stored within a data asset persisted as a file. For example the Microsoft™ advanced systems format ("ASF") supports the placing of support metadata within the file format itself. Alternatively, the metadata may be stored separately and distributed as a companion file for the one or more sets of data assets.

In step 430, media is captures, which may include capturing an event and metadata at the same time. Examples include, but are not limited to, location markers, timestamp, and telemetry. As in step 420, the metadata may be stored along with the data in the asset as a file, but could alternatively be stored separately in a companion file.

In scenarios where there are a small number of users with a small number of files, the files may be retrieved or edited in place in a peer to peer network. In such situations, a web service may not be necessary, and per step 440, may bypass joining a group and participating in a web service.

However, in peer to peer connections, the larger the number of users, the more cross-connections and communication overhead is required. For N users, there are (N*(N+1))/2. Thus, for example, three users would require six cross-connections and four users would require ten cross-connections. Since the overhead to maintain connections would become prohibitive, for a large number of users, a web service may be preferable. Per step 440, a non peer-to-peer scenario may involve a web service by which a group may be joined corresponding to the Event ID and the data asset being uploaded to a central storage. For example, when uploading a videofile to a web-based video repository, a user may upload an associated text field which in turn may contain an Event ID. As part of the upload, the user may also upload license data (not shown). As an alternative to a web service, a service on a corporate LAN might be employed as well.

In step 470, once the data asset has been captured, a decision to modify the data asset may be made. The modification may include, but not be limited to, one or more of adding metadata, applying post-processing including combining data assets via correlation metadata, or persisting the data asset for distribution in steps 472 and 480.

In step 471, metadata is applied after the data is captured. In fact, the Event ID may be edited or changed, or an additional Event ID may even be added. Further, custom metadata may be added; or if custom fields of metadata are redefined, old metadata may be made consistent with a new format. In the case of external data assets being added, as described in reference to FIG. 2, items 230 and 260, metadata may be converted to match metadata of other data assets. In step 473, data assets are post-processed. Such post-processing may include editing the data asset, e.g., cropping photos, changing color distribution; providing other special effects; or combining data assets. For example, combining and correlating an audio track and a video track may be considered to be post-processing or perhaps are just combine virtually for during the process. An example is a police video from a car in the form of a file and audio overlaid from the device that recorded audio while outside of the car.

In step 472, if the decision is to share the data asset separate from the platform as disclosed, the data asset may be stored on a separate portable media such as a memory stick or DVD-ROM. Alternatively it may be stored on a network drive. The sharing may be in the form of a single file, or alternatively in a distribution of one or more data and one or several metadata files.

In this exemplary method embodiment, the result is a single multimedia file or single distribution that combines multiple data assets that have been correlated for consumption by a user.

Exemplary Hardware Platform

The platform implemented by the various embodiments described herein may be based on commodity hardware. In the alternative, custom hardware may be applied to implement the platform for improved speed or efficiency. The server hardware may be based on a standard personal computer ("PC") architecture, or may be based on cloud computing as will be described later. The client may be a PC client with the ability to capture media, or a custom mobile client as described in FIG. 5.

(i) Standard PC Architecture

Both servers and clients for the platform implemented by the various embodiments described herein may be based on a PC architecture. Specifically, there may be a processing unit comprised of one or more central processing units ("CPUs") that each has one or more cores. There may be an on board read only memory ("ROM"), e.g., a basic input/output system ("BIOS"), which manages boot up. For working memory, there may be random access memory ("RAM"); for storage, including virtual swap space, there may be one or more hard drives. There may further be an input/output interface to support both serial and parallel operations. The input/output interface may contain support for a mouse and keyboard, or the PC may have a separate interface. All these parts may be connected on a bus to multiplex data and instruction connectivity. There may be a fast bus for CPU communications to RAM and a slow bus for input/output operations. Connectivity between the two buses may be handled by a northbridge.

The input/output interface may include connectivity to a number of peripherals. Expansion cards or on-motherboard functionality may be directly connected to the bus. Further, there may be a video graphics card, which, in turn, may provide connectivity to a video monitor. If the PC is to be networked, there may be a modem or network interface card ("NIC"). NICs may support a wide range of protocols. The PC may even have a cellular modem. Audio functions such as microphone and speaker support may be supported by an audio card. Interface for optical storage such as CD-ROM, DVD-ROM, and BluRay™ disks may be handled through the input/output interface. Other portable storage such as memory sticks/thumb drives and legacy floppy drives may also be handled through the input/output interface.

In the case of clients, for media capture, cards supporting fast input/output such as Universal Serial Bus ("USB") 2.0 and Institute of Electrical and Electronics Engineers standard no. 1394 ("IEEE 1394"), also known as "FireWire" interfaces can be supported by a PC, e.g., high resolution microphones and video cameras. However, fast input/output can be any sort of data acquisition, including, but not limited to, location sampling, telemetry, or other streaming data feeds.

In the case of servers, large arrays of storage, such as Redundant Array of Inexpensive Disks ("RAID arrays") are common. Multiple CPU and multiple core configurations with relatively large amounts of RAM provide support for large numbers of users.

(ii) Exemplary Mobile Client

Figure 5:
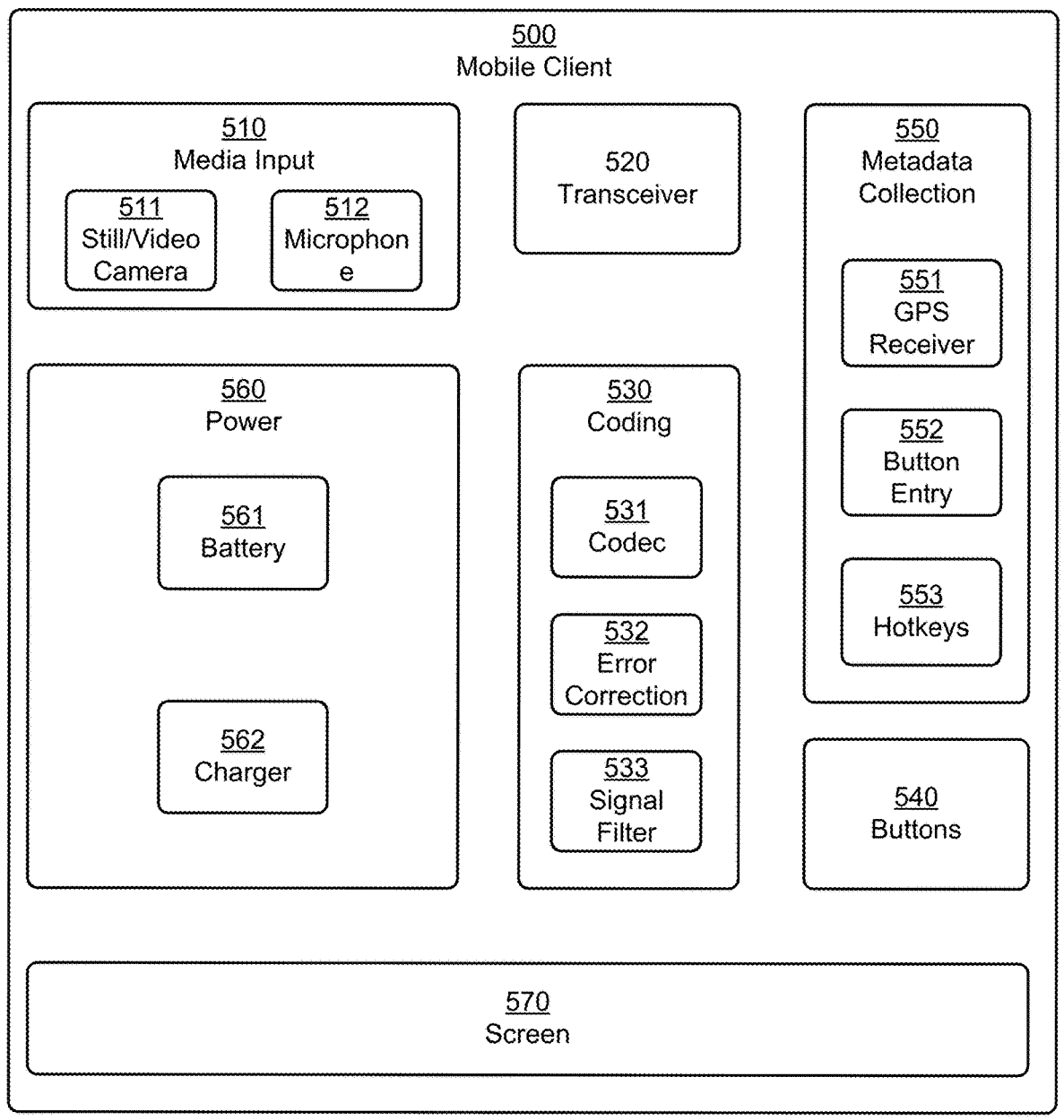
FIG. 5 is a diagrammatic illustration showing key components of hardware for an exemplary mobile client in accordance with various embodiments for correlating media for distributed services.

FIG. 5 shows a client embodied in the form of a multimedia cell phone. Exemplary mobile client 500 contains functionality for cell phone communications including, but not limited to, transceiver 520 and a set of coding functions usually embodied in a chip set 530. Known computing functions such as a processor, bus, system clock, and memory, including but not limited to RAM, ROM, flash ROM and connectivity hardware such as antennae are not shown.

Mobile client 500 is powered by power functions 560. Information is entered via buttons 540, and potentially via a screen 570 if it is a touch screen. Visual output is provided through screen 570. Media can be captured through media input functions 510, including video and still cameras 511, and microphones 512. Metadata including correlating metadata may be entered via metadata collection functions 550. These functions are described in detail as follows.

Client 500 may receive a signal via the antenna (not shown), and then signal may then be sent to the receiving function of the transceiver 520. After the transceiver, there may be a function to determine what type of signal is being received (not shown), to distinguish between background noise and actual voice input. After the signal type has been determined, the signal may be sent to codec 531 in the coding functions 530. The decoded signal may then be forwarded to filters 533 and error corrector 532, both of which may improve the quality of the decoded signal. Finally, the signal may be forwarded to an appropriate rendering mechanism. For example, if the signal is a voice signal, then it may be sent to a transducer such as a speaker (not shown); if the signal is SMS or web browsing data or other software data, it may be sent to an appropriate software application and then displayed on screen 570.

A signal may be then generated in response, be it through voice from a transducer such as a voice microphone (not shown), through buttons 540, or other inputs such as a stylus (not shown) or screen 570 if it supports touch screen functions. Regardless if the input is voice or software, or a combination of the two, the signal is then forwarded to the appropriate codec 530 for coding, and then for transmission in the transmission function of the transceiver 520, and then to the antenna (not shown).

Client 500 has the ability to capture media. Contemporary cell phones also support on board media input 510 for video and still data via a camera 511 and via a microphone 512. While these are known forms of input, further media input may be through data connections such as pod casts and other streams (not shown).

Client 500 further includes the ability to respond to triggering events. For example, a Radio Frequency ID ("RFID") reader (not shown), can provide a software notification that an RFID card has been read an acknowledged. In turn, the camera may be turned on for recording. Another example is a vehicle collision detector creating a software event to turn on recording.

In additional to capturing media and triggering events, client 500 includes metadata collection functions 550. For example, samples of location metadata may be collected by location service receiver 551. Geolocation metadata may include Global Positioning System ("GPS") metadata. However, because GPS is prone to error from GPS signals bouncing off of buildings in urban settings, geolocation metadata may alternatively be determined by triangulating signal strength or weakness from different cell towers with known locations. For relatively immobile clients, receiver 551 may collect geolocation metadata via internet protocol ("IP") address.

Another form of metadata is date/time data. Obtaining date/time metadata for client 500 may be accomplished using an onboard clock (not shown). Alternatively, date/time metadata may be obtained from a signal from a cell phone tower.

Yet another form of metadata is text, generally entered by a user pushing buttons 540. Client 500 may utilize a software application by which the user enters metadata values via the 10 key pads or via a touch screen 570. Such traditional button entry would be handled via button entry function 552.

Alternatively, custom functions for hotkeys 553 may be employed. Specifically, hotkeys may be used to enter common tags. For example, a user may enter the "#" key to indicate the use of a metadata tag key. Further, the user may enter a number, for example "2" if the number was not already defined and text in the value for a metatag, such as "Jane." Thus, the next time the user wanted to tag a photo with the name "Jane," the user would press "#" to trigger metadata mode and then press "2," and then "Jane" would then be associated with the photo. If no photo or media file was available upon triggering the hotkey, the user may be prompted to delete or edit the hotkey for different use. This would ease the otherwise cumbersome task of associating metadata with a restricted user interface.

Other metadata input/output functions, may include, but not be limited to USB and FireWire. Input/output functions on client 500 may include but are not limited to: (1) providing other sources of media capture, (2) providing sources of detectors of triggering events, and (3) providing sources of metadata capture. Accordingly, in alternative to FIG. 5 where all of these functions are on board the mobile client 500, these functions could be accomplished via peripheral hardware. Not shown are custom chips to aid in functions typically enabled via software. These include but are not limited to data compression chips and encryption algorithms. Power functions 560 provide power to the all of client 500. Typically this is in the form of a battery 561. But a charger/AC input 562 typically recharges the battery or provides direct power.

An alternative form of charging may be performed using inductance coils. In situations such as law enforcement, remembering to charge a client device may not always be present in a user's mind. By implementing the charger as an inductance system including a program to manage the charging. Specifically, the program may determine when the system is being charged, how much power to convert, and when the system is to be disconnected. The on board mobile client processor (not shown) or a separate processor may alternatively be used, as may the on board mobile client RAM (not shown) or separate memory be used. The mobile client may also have an inductance coil to receive energy, and then to the power functions 560 and there to the battery.

An off board charger may be configured as an inductance coil that connects to an electrical power source, and may further include a processor and memory to indicate when to charge and how much to charge the client device. The off board charger may even further include an indicator having a charge status indicator in the form of colored light emitting diodes ("LEDs") or, alternatively, an LED array.

Alternative charging configurations may include placing the mobile client's charger 562 off of the device and elsewhere on the person of the user. For example, coils may be placed in the sole of a user's shoe, in or on the seat of the user's pants, in the user's belt, or in the web gear of the user. The corresponding charger may further be disposed on the gas pedal of the user's car or even on a car seat, which could then charge the client device whenever the coils are proximate.

(iii) Mobile Client Chassis

In order to support vehicle mounting, the mobile client may be placed within a chassis of aluminum or other material, with an extendable arm that connects to the windshield of a car, much like a rear view mirror. The chassis may have tamperproof qualities and may include one or more security locks that prevent theft or unauthorized modification of the mobile client.

The mobile client components may be divided into two portions to support a secure recorder configuration: (1) the data gathering portion, including cameras and microphones, and (2) the storage portion which contains the stored data. This latter storage portion may be secured in a hidden and hardened portion of the vehicle to prevent theft or unauthorized modification. The data gathering portion should be in public view; therefore, in order to best capture the surrounding events, the ability to conceal this portion is limited. However, if a malicious actor steals the camera, the actor steals only the device but not the data, which then may be later used for its intended purpose, or even to help determine who stole the camera. The hidden portion may also be hardened such that in the event of an accident, the data storage may be recovered or still functional to upload data.

Several alternatives may be exercised to prevent stealing the data gathering portion. One alternative is to integrally mount the data gathering portion into the vehicle's dashboard, such that removal requires removing the dashboard and unbolting the device. This alternative would lengthen the amount of time to remove the data gathering portion to greatly increase the chances that a would-be thief would be caught. For scenarios where an officer wants an option to move the camera, the camera may be removed from the vehicle when not in operation, and stored securely in a separate location. In either alternative, a would-be thief is deterred or prevented from stealing the data gathering portion.

Connectivity

Embodiments of the platform support data connectivity. Data connectivity from a PC architecture client is primarily from a network interface card, for example an Ethernet card, or in the alternate from a dial up modem. Data connectivity from a mobile client most commonly would be via a cellular connection. Clients are not limited to just one form of connectivity, and may have multiple data connections. For example, a PC client may have both a modem and a network interface card; or a mobile client may have both a cellular and Wi-Fi connection.

Connectivity support is not limited to data connectivity. Connectivity support may also be for voice data as with ordinary cellular connectivity. Support for device communication, e.g., Bluetooth support, may also be available.

Various embodiments of the client may support a full network stack. At the data link layer, client support may include, but is not limited to, Ethernet support for PC clients and Wi-Fi support for both PC clients and mobile clients. For Network/Session/Transport layer protocols, support may include transmission control protocol/internet protocol ("TCP/IP"), user datagram protocol ("UDP"), and other protocols. For application layer protocols, file transfer protocol ("FTP") support for uploading large media files may be available, hypertext transfer protocol ("HTTP") may be available for web access, and simple mail transfer protocol ("SMTP") may be available for email access.

Embodiments of the platform may support peer-to-peer connectivity, by which client devices may create an ad hoc network to access and trade files. In the alternative, embodiments of the platform as disclosed may also support dedicated networks. For example one remote client may videotape an event and another client may record the audio of an event. The remote clients may support infrared data association ("IRDA") standards and may be able to transfer files to each other. Since IRDA is slower than Wi-Fi, the remote clients may support Wi-Fi and set up a private ad hoc network between the two. Finally the remote clients may participate in a dedicated network along with PC clients.

Extended Platform

Since multimedia files are large, even with compression, embodiments of the platform may create large amounts of data. Accordingly the data may be stored on cloud computing centers. By integrating with cloud computing, the embodiments described herein may make available large amounts of storage and further provide access to compute-intensive applications available on cloud computing platforms. However, integration may result in degraded performance and over-reliance on a third party.

There are a number of compute-intensive applications that may be hosted alone on large computer clusters. Face recognition is one such application. However, when such applications and databases are hosted on a cloud computing node, in addition to having higher availability of a larger number of compute resources, the application is not inherently networked. One application of the various embodiments described herein includes a client camera capturing a video frame or still image, extracting out a subject's face using standard algorithms, and then calling a cloud computing database.

Figure 6:
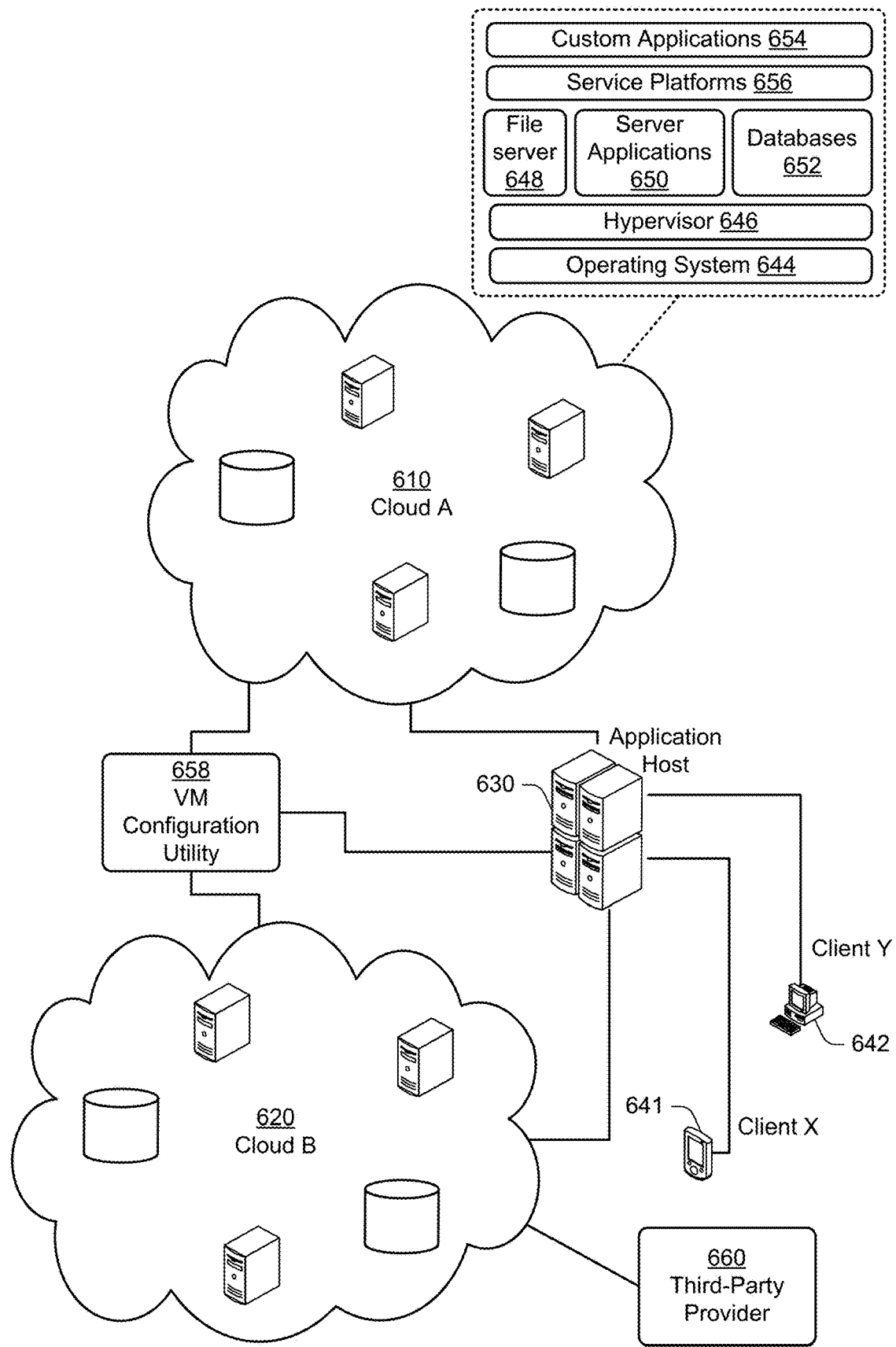
FIG. 6 is a diagrammatic illustration of correlating media for distributed services in a cloud computing environment.

FIG. 6 indicates an exemplary implementation of such a scheme. Cloud 610 has a number of web servers, hosted applications, including but not limited to the face recognition software, and databases, including but not limited to a database of faces. An application host 630 may include an uploading web service but may delegate cloud computing requests to applications from non-cloud clients 641 and 642.

An embodiment of the uploading implementation may be described with respect to remote client 641, which has a still camera, and PC client 642, which has a number of still photos stored as files. PC client 642 with may store a number of still photos with the name of the person stored with the file as correlation metadata in the form of a tag. The PC client 642 may upload the photos to the application host 630 via a web service. The application host may then store the photos to central storage in cloud 610 where is the photos may be available for retrieval via search and correlation. In the alternative, PC client 642 may upload the untagged photos and then tag them with metadata after the uploading.

An embodiment of the download process may be described with respect to remote client 641, which takes real-time still photos at an event. The context may be in law enforcement surveillance or in photojournalism. Regardless, the user of remote client 641 may automatically tag the photo with the names of individuals on the photos. Remote client 641 may upload the photos to application host 630 via a web service which may then store the photos on a central store in cloud 610. Once on the web service, the remote client 641 may request the photos to be automatically tagged. The application host may then invoke a face recognition application running on the cloud to retrieve all photos that are similar to the faces in the photo uploaded from remote client 641. Where the retrieved photos do not have sufficient similarity to the photo uploaded from remote client 641, third party databases may be invoked. Based on the tags provided from PC client 642 as well as all other clients that stored photos in the database, the relevant tags may then be applied to the photo uploaded by remote client 641.

Because the correlation and presentation are integrated together FIG. 2, item 220, custom features such as autotagging are available. More importantly, because the embodiments as disclosed integrates with external data FIG. 2, item 230, and provides for metadata correlation FIG. 2, item 260, it can integrate with third party databases such as facial databases; including integration with cloud computing applications.

This integration with cloud computing applications provides for faster responses. Accordingly, remote client 241 might receive the names of the individuals just taken in a photo immediately. Additionally, the remote client 241 might receive additional information such as company name or other professional information. On a variation of the above scenario, the user could have taken a picture of a product in a store, used object recognition software in the cloud, and similarly retrieved product information. The foregoing is exemplary and not intended to be a limiting or exhaustive list of possible applications of extending the present platform to include cloud computing.

The integration of the described herein may not only provide feedback regarding the accuracy of the facial recognition, but may also work to improve matches. For example, if clients 641 and 642 are organized into a group, the likelihood of retrieving false matches from a general database is removed by limiting the face recognition database only to members of the group. Furthermore, by adding autotagged photos to the general database, especially after post capture corrections, provides an ever improving sample of photos to determine facial matches. Facial recognition capabilities may be augmented by taking changes over time, such as hair style, and the growth of mustaches and beards, and could return name information but also time period information.

One problem with cloud computing integration is that data may be widely distributed geographically, thus creating wide variances in network latency and performance. For example, in FIG. 6, cloud 610 may be located in or near Seattle, Wash. but cloud 620 may be located in or near Washington, DC. Thus, a user located in Seattle would likely experience slow data retrieval if the data were based in cloud 620 but better performance of data based in cloud 610.

Accordingly the application host 630 may manage offline, edge, and nearline data by (1) caching data on application host 630 itself and (2) invoking server affinity, which guarantees that a particular server, or at least a particular cloud, is to serve data to a particular user. Data that is known to be needed commonly may be placed on the application host that is nearline. Data that is known to be needed by users geographically local to the cloud, but is not commonly used may be pinned to a local server or a local cloud via server affinity. Placing data redundantly on different edge points of the cloud may not be cost or storage prohibitive because cloud computing provides large amounts of storage. Further, data that is not time sensitive may be stored offline or arbitrarily on the cloud.

Another problem with cloud computing is over-reliance on a single cloud computing provider. For example, where the central storage is hosted on a cloud for a production system such as for law enforcement, cloud failure means data storage is lost. If the law enforcement force was in a major city such as New York with 1,000 policemen on duty, down time of a cloud for 1 hour would be a loss of almost a man-year of data. Cloud computing is a relatively new technology, cloud computing brownouts and blackouts are possible. Additionally, much data, in particular in law enforcement scenarios must be made secure.

The application host 630 may integrate storage across clouds 610 and 620 from different cloud computing providers and mirror. Alternatively, the application host 630 may implement a RAID scheme, which may subdivide data across three clouds, all from different providers. Security, which may include auto-encryption, may be enhanced since no single cloud provider is likely to have all the data. In both cases, storage availability is improved.

In various embodiments, each of the multiple clouds, such as cloud 610 and the cloud 612, may have a corresponding cloud infrastructure that is made up of software infrastructure components. For example, the cloud 610 of a first computing provider may have server infrastructure components and cloud infrastructure components. The server infrastructure components may include an operating system 644 and a hypervisor 646. The operating system 644 include components that enable the servers of the cloud 610 to receive and transmit data via various interfaces (e.g., user controls, communication interface, and/or memory input/output devices), as well as process data using processors to generate output. The operating system 644 may include a presentation component that presents the output (e.g., display the data on an electronic display, store the data in memory, transmit the data to another electronic device, etc.). Additionally, the operating system 644 may include other components that perform various other functions generally associated with an operating system. For instance, the operating system 644 may be Windows-based operating system, a Linux-based operating system, or another type of operating system. The hypervisor 646 may be a software component that creates and executes virtual machines (VMs). A virtual machine may be an emulation of a particular computer architecture and functions of a computing system that is designed to perform one or more specific computing services. The hypervisor 646 may create virtual machines using the software infrastructure components that are available from the cloud infrastructure of the cloud 610.

The cloud infrastructure components of the cloud 610 may include a virtual file server 648, server applications 650, databases 652, and custom applications 654. The virtual file server 648 may manage the storage and retrieval of files from multiple servers of the cloud 610, such that computing devices may access the data from the cloud 610. The virtual file server may provide data to client devices via multiple protocols, such as File Transfer Protocol (FTP), Network File System (NFS) protocol, Server Message Block (SMB) protocol, Common Internet File System (CIFS) protocol, Hypertext Text Transfer protocol (HTTP), and/or so forth. In some implementations, the virtual file server may interface directly with the operating system 644 to manage data access within the cloud 610. The server applications 650 may include applications that provide web services and service platforms 656. For example, the web services may include web servers such as the Apache™ HTTP Server, Internet Information Services (IIS), NGINX, and/or so forth. The service platforms 656 may include platforms for building and deploying specific applications and services, such applications and services for storing, analyzing, and distributing content in the form of data assets and metadata. For instances, the service platforms 656 may include the Microsoft™ Azure platform, the Amazon™ Amazon Web Services (AWS) platform, the Apache™ Hadoop platform, and/or so forth.

The database 652 may include transactional and non-transactional databases that store data for the various applications of the cloud 610. The transactional databases may be databases that store data in relational data entries. The transactional databases are designed to balance read and write performance in order to handle large volumes of data. On the other hand, the non-transactional database may store data under the principle of eventual consistency as associated data blobs rather than relational data entries. As a result, a non-transactional database may provide faster data read speed than a transactional database. Examples of these databases may include Microsoft™ SQL, MongoDB™, and/or so forth.

The custom applications 654 may include applications that are designed to perform specific functionalities. For example, a custom application may be used to analyze the capture data assets and metadata to dispatch police officers to crime scenes. However, in other example, the custom applications 654 may include point of sale (POS) applications, customer relationship management (CRM) applications, and/or other applications that perform other custom functionalities.

The multiple clouds, such as the cloud 610 and the cloud 612, may have different configuration of software infrastructure components than the cloud 610. In other words, the cloud 612 may be missing one or more software infrastructure components that are present on the cloud 610. Alternatively or concurrently, the cloud 612 may have one or more software infrastructure components that are not present on the cloud 610. Thus, depending on the specific software infrastructure components that are present on each cloud, the cloud may perform identical or different service roles. For example, a cloud may act as an Infrastructure as a Service (IaaS) platform, a Platform as a Service (PaaS) platform, a Software as a Service (SaaS) platform, or another type of cloud platform.

The application host 630 may backup data to clouds of multiple cloud computing providers that do not share a common cloud computing infrastructure, i.e., the clouds have different sets of cloud computing infrastructure components. Alternatively, the application host 630 may also transfer the data used for providing a particular cloud service between such multiple cloud computing providers. In various embodiments, the data to be backed up or transferred may be stored in virtual machines of clouds that are maintained by the cloud computing providers.

In the data backup scenario, the application host 630 may use a differentiation algorithm to compare the software infrastructure components of the cloud 610 with the software infrastructure components of the cloud 612. In other words, the differentiation algorithm may be used to ascertain a "least common subset" of software infrastructure components. For example, the cloud 610 and the cloud 612 may have one or more different server infrastructure components, one or more different cloud infrastructure components, and one or more different application components. These differences may manifest as differences in operating systems, file servers, service applications, databases, service platforms, and/or custom applications. Based on the comparison, the differentiation algorithm may detect one or more software infrastructure components that are present on the cloud 610 but missing from the cloud 612. The one or more missing software infrastructure components may prevent the cloud 612 from instantiating virtual machines that are capable of storing the data to be backed up from the cloud 610. For example, while the cloud 610 stores data in a non-transactional database, the cloud 612 may lack a non-transactional database that is capable of storing a backup of the data from the cloud 610.

Accordingly, when the application host 630 detects that one or more software infrastructure components are missing from the cloud 612, the application host 630 may relay the configuration data on the missing infrastructure components to a VM configuration utility 658. The VM configuration utility 658 may be a utility that is capable of automatically provisioning virtual machines to perform specific tasks. In various embodiments, the VM configuration utility 658 may provision a virtual machine using resources (e.g., applications packages, data files, etc.) from multiple sources, in which the sources are different cloud computing providers, different servers, different cloud infrastructures, and/or so forth. For example, the VM configuration utility 658 may configure a virtual machine using server applications from a first cloud, databases from a second cloud, and custom applications from a third cloud. The configuration of a virtual machine by a VM configuration utility 658 may further include installation of one or more application packages into the virtual machine, the start of one or more services, or the writing of one or more specific data files into the virtual machines.

Thus, based on the configuration data relayed by the application host 630, the VM configuration utility 658 may generate an implementation file. The execution of the implementation file may cause the VM configuration utility 658 to initiate a creation of a virtual machine to receive the backup data from the cloud 610. As a part of the instantiation of the virtual machine, the VM configuration utility 658 may obtain the one or more software infrastructure components that the cloud 612 lacks from one or more third-party providers, such as a third-party 660. The third-party providers may include a third-party cloud computing provider, a third-party server, or any other computing entity that is not a part of the cloud 610 or the cloud 612. At a runtime following instantiation, the VM configuration utility 628 may provision the virtual machine with the one or more obtained software infrastructure components, as well as one or more software infrastructure components that are already present in the cloud 612. The provision of the virtual machine may involve the installation, duplication, execution, and/or configuration of each software infrastructure component with respect to the virtual machine. In various embodiments, the VM configuration utility 658 may execute the implementation file based on a command from the application host 630. As a result of the provisioning, the virtual machine as instantiated by the cloud 612 may have identical software infrastructure components as a virtual machine that is instantiated by the cloud 610.

Once the virtual machine is successfully instantiated by the cloud 612, the application host 630 may copy the data stored on the cloud 610 to the cloud 612 in order to backup the data. In various embodiments, "least common subset" technique as described may be used to configure virtual machines of multiple clouds to backup data from a single cloud, virtual machines of a single cloud to backup data from multiple cloud, virtual machines of multiple clouds to backup data from multiple clouds, and virtual machine of a single cloud to backup data from another single cloud.

Accordingly, the application host 630 may implement various backup schemes, such as RAID 0, RAID 5, RAID 10, or other mirroring or striping schemes. In RAID 0, one cloud may act as a mirror store for another cloud. For example, the cloud 612 may act as a mirror store for the cloud 610. In RAID 5, block-level striping may be used distribute mutual backup information among virtual machines of multiple clouds. RAID 10 may be implemented using a minimal of four stores that reside on multiple clouds, in which the stores are used to provide distributed striping of mirror backups.

In an alternative scenario, the application host 630 may transfer data from an original cloud computing provider to an alternative cloud computing provider, so that the alternative cloud computing provider may take over the provision of cloud service from the original cloud computing provider. In such a scenario, the cloud of the original cloud computing provider may be providing one or more virtual machines that are performing a particular cloud service. The particular cloud service may be the storage of data collected by multiple user devices, distribution of the data to multiple client devices, such as the data assets and their related metadata, the analysis of data, the modification of data, and/or so forth. As such, the application host 630 may ascertain one or more software infrastructure components that are missing from a cloud of an alternative cloud computing provider. Subsequently, the application host 630 may work with the VM configuration utility 658 to ensure that any virtual machines instantiated by the cloud of the alternative cloud computing provider is provisioned with the one or more missing software infrastructure components. In this way, the new virtual machines that are instantiated by the cloud of the alternative cloud computing provider may function to provide the particular cloud service.

In such a scenario, the application host 630 may initiate a transfer of the data that is used to provide the particular cloud service from the original cloud computing provider to the alternative cloud computing provider. The application host 630 may initiate such a transfer following the instantiation of the one or more new virtual machines by the alternative cloud computing provider. In various embodiments, the application host 630 may deactivate delivery of new incoming data used to provide the particular cloud service to the virtual machines of the original cloud computing provider. Instead, the application host 630 may initiate provisioning of the virtual machines of the alternative cloud computing provider with the incoming data. Subsequently, the application host 630 may initiate copying of the existing data on the virtual machines of the original cloud computing provider to the virtual machines of the alternative cloud computing provider. Following the copying of the existing data, the application host 630 may initiate the execution of the virtual machines of the alternative cloud computing provider to provide the particular cloud service. Subsequently, the application host 630 may initiate an execution termination for the virtual machines of the original cloud computing provider. Further, the existing data used by the virtual machines of the original cloud computing provider may be deleted based on a command for the application host 630. In various embodiments, the copying application-specific data may be handled differently than generic data. The application-specific data may be data that are used by the server applications 650, the custom applications 654, and/or data that are stored in proprietary data formats in the databases 652. In contrast, generic data may include any other data that are used by the virtual machines to provide the particular cloud service.

The application host 630 may initiate a direct copy to transfer the generic data from the virtual machines of original cloud computing provider to the virtual machines of alternative cloud computing provider. In contrast, the application-specific data may be copied into the virtual machines of the replacement cloud computing device via one or more data loaders. Each data loader may ensure that a corresponding set of application-specific data is stored in a database according to a specific data scheme. For example, application-specific data for the Apache™ Hadoop platform or the MongoDB™ database may be loaded into a corresponding database via a corresponding custom data loaders. In some instances, the VM configuration utility 658 may direct a custom data loader to load application-specific data into a database of a virtual machine. In other instances, the VM configuration utility 658 may direct a scheduler to activate the data loader at predetermined times or in response to predetermined events to load application-specific data into a database of a virtual machine. In this way, the VM configuration utility 658 may synchronize the instantiation of the virtual machine and the subsequent loading of the application-specific data. In some implementations, the VM configuration utility 658 may use a scheduler to activate the custom data loader for the purpose of synchronization.

The application host 630 may initiate a transfer of the data that is used to provide the particular cloud service from one cloud computing provider to another cloud computing provider in multiple situations. In one situation, the application host 630 may initiate a transfer upon receiving a command that is inputted by a human administrator. The administrator may input the command following a decision to stop utilizing the services of a cloud computing provider. Alternatively, the command may be generated by a backup scheduler component of the application host 630. In another situation, the application host 630 may initiate the transfer after one or more computed metrics or reported metrics from the original cloud computing provide indicate that the cloud computing provider failed to meet a service level agreement (SLA). The SLA may be committed to by the cloud computing provider for a predetermined time period. The metrics may include data throughput, data latency, data processing speed, mean time between failures (MTBF), error resolution rate, error response time, and/or so forth, in which thresholds and requirements for these metrics may be specified by the SLA.

In an additional situation, the application host 630 may initiate the transfer after receiving an automated notification that a security breach exists with respect to the data that are stored with a cloud computing provider. The notification may be in the form of an auto-generated electronic message that is received from the cloud computing provider. The notification may indicate that a security breach occurred or is expected to occur with respect to the data or that a security breach is imminent with respect to the data. The security breach may involve current or imminent unauthorized and/or undesired access to the data stored with the cloud computing provider.

In additional embodiments, the clouds of the multiple cloud computing providers may be used in a different manner to guarantee the security and the integrity of data in other embodiments. In such embodiments, data belonging to an entity may be distributed among the clouds of the multiple cloud computing providers for storage. In this way, the cloud of each cloud computing provider may only store a portion of the data belonging to the entity via a striping scheme. Accordingly, a data security breach at one cloud computing provider may only compromise a portion of the data. However, the portions of the data stored at the clouds of the other cloud computing providers are unaffected by the security breach. In such instances, because of the distributed storage across the clouds of multiple cloud computing provider, a third party who is able to gain access to the compromised portion of the data may be unable to use or make sense of the compromised portion without having access to the remaining portions of the data.

For example, the digital data that encodes a data file may be stored in separate data portions at the clouds of the multiple cloud computing providers. The data file may contain data for a data asset, a document, an application, or another type of data file. Thus, a third party that gains access to a data portion of the data file may nevertheless remain unable to decode the data file for use due to the lack of access to the other data portion or portions of the data file. In another example, a data asset may be stored on the cloud of a first cloud computing provider, while the metadata associated with the data asset may be stored on the cloud of a second cloud computing provider. Thus, a third party that gains access to either the data asset or the metadata may be unable to make meaningful use of the data asset or the metadata without their counterparts. In an additional example, an encrypted data file may be stored on the cloud of a first cloud computing provider, while an encryption key for the data file may be stored on the cloud of a second cloud computing provider. Thus, a third party who gains access to either the encrypted data file or the encryption key may be unable to actually ascertain the content of the encrypted data file.

Since the data portions of a data file share common characteristics, it may be advantageous to configure the clouds of the multiple cloud computing providers to have identical software infrastructure components. Accordingly, the application host 630 may divide the data file into a predetermined number of data portions using a file splitter or file demultiplexer algorithm. Subsequently, the application host 630 may use the differentiation algorithm to compare the software infrastructure components of each cloud computing provider to an infrastructure component specification to detect missing software infrastructure components from one or more of the multiple cloud computing providers. The infrastructure component specification may be a configuration file that designates the desired software infrastructure components that each cloud computing provider is to be equipped with in order to perform operations on the data file, in which the operations may include storage, retrieval, processing, analysis, and/or so forth. Accordingly, the VM configuration utility 658 may use the information generated by the differentiation algorithm to configure the multiple cloud computing providers with VMs having identical software infrastructure components. Once the VMS are configured on the multiple cloud computing providers, the application host 630 may store the data portions of the data file on different cloud computing providers.

Exemplary Data Backup and Transfer Operations

FIGS. 7-12 show illustrative processes 700-1200 that implement data backup and transfer across multiple cloud computing providers. Each of the processes 700-1200 is illustrated as a collection of steps in a logical flow diagram, which represents a sequence of operations that can be implemented in hardware, software, or a combination thereof. In the context of software, the steps represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described steps can be combined in any order and/or in parallel to implement the process. For discussion purposes, the processes 700-1200 are described with reference to the cloud computing environment shown FIG. 6.

Figure 7:
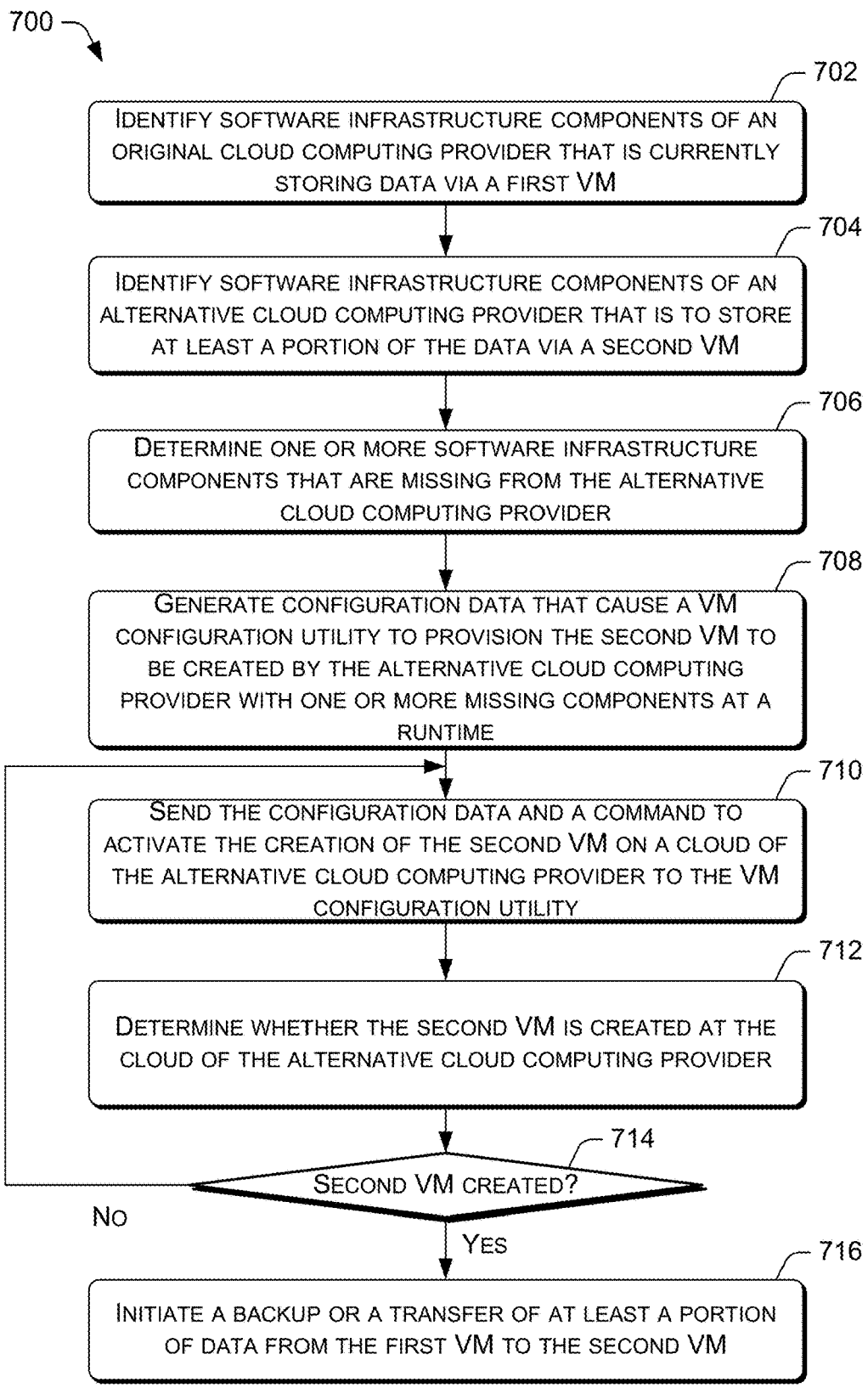
FIG. 7 is a flow diagram of an illustrative process for creating and provisioning a virtual machine of an alternative cloud computing provider to receiving data from the virtual machine of an original cloud computing provider.

FIG. 7 is a flow diagram of an illustrative process 700 for creating and provisioning a virtual machine of an alternative cloud computing provider to receiving data from the virtual machine of an original cloud computing provider. At step 702, the application host 630 may identify software infrastructure components of an original cloud computing provider that is storing data via a first virtual machine. In various embodiments, the software infrastructure components may include an operating system, a hypervisor, a virtual file server, server applications, databases, service platforms, and/or custom applications. The first virtual machine may be using the data to provide a particular cloud service (e.g., data distribution, data analysis, etc.) to one or more user devices.

At step 704, the application host 630 may identify infrastructure components of an alternative cloud computing provider that is to store at least a portion of the data via a second virtual machine. The second virtual machine is to be created by the alternative cloud computing provider. Once again, the software infrastructure components may include an operating system, a hypervisor, a virtual file server, server applications, databases, service platforms, and/or custom applications.

At step 706, the application host 630 may determine one or more infrastructure components that are missing from the alternative cloud computing provider. In various embodiments, the application host 630 may accomplish this task using a differentiation algorithm. In other words, the differentiation algorithm may be used to ascertain a "least common subset" of software infrastructure components between the original cloud computing provider and the alternative cloud computing provider. For example, the cloud 610 and the cloud 612 may have different operating systems, file servers, service applications, databases, service platforms, and/or custom applications.

At step 708, the application host 630 may generate configuration data that cause a VM configuration utility to provision the second virtual machine to be created by the alternative cloud computing provider with one or more missing components at a runtime of the second virtual machine. At step 710, the application host 630 may send the configuration data and a command to activate the creation of the second virtual machine on a cloud of the alternative cloud computing provider to the VM configuration utility. In various embodiments, the VM configuration utility 658 may generate an implementation file based on the configuration data relayed by the application host 630. The execution of the implementation file may cause the VM configuration utility 658 to initiate a creation of a virtual machine. As a part of the instantiation of the virtual machine, the VM configuration utility 658 may obtain the one or more software infrastructure components that the alternative cloud computing provider lacks from one or more third-party providers.

At step 712, the application host 630 may determine whether the second virtual machine is created at the cloud of the alternative cloud computing provider. In various embodiments, the determination may be made based on status messages received from the VM configuration utility 658. For example, upon the successful creation of the second virtual machine, the utility may send a creation complete message to the application host 630. On the other hand, if the creation of the second virtual machine was not successful, the utility may send a creation failure message to the application host 630. At decision step 714, if the application host 630 determines that the second virtual machine is created ("yes" at decision step 714), the process 700 may proceed to step 716. At step 716, the application host 630 may initiate a backup or a transfer of at least a portion of the data from the first virtual machine of the original cloud computing provider to the second virtual machine of the alternative cloud computing provider. For example, the backup of the data may be implemented using various backup schemes, such as mirroring or striping, or so forth. In another example, the complete transfer of the data from the first virtual machine to the second virtual machine may enable the alternative cloud computing provider to take over providing a particular cloud service. However, returning to decision step 714, if the application host 630 determines that the second virtual machine is not created ("no" at decision step 714), the process 700 may loop back to step 710.

Figure 8:
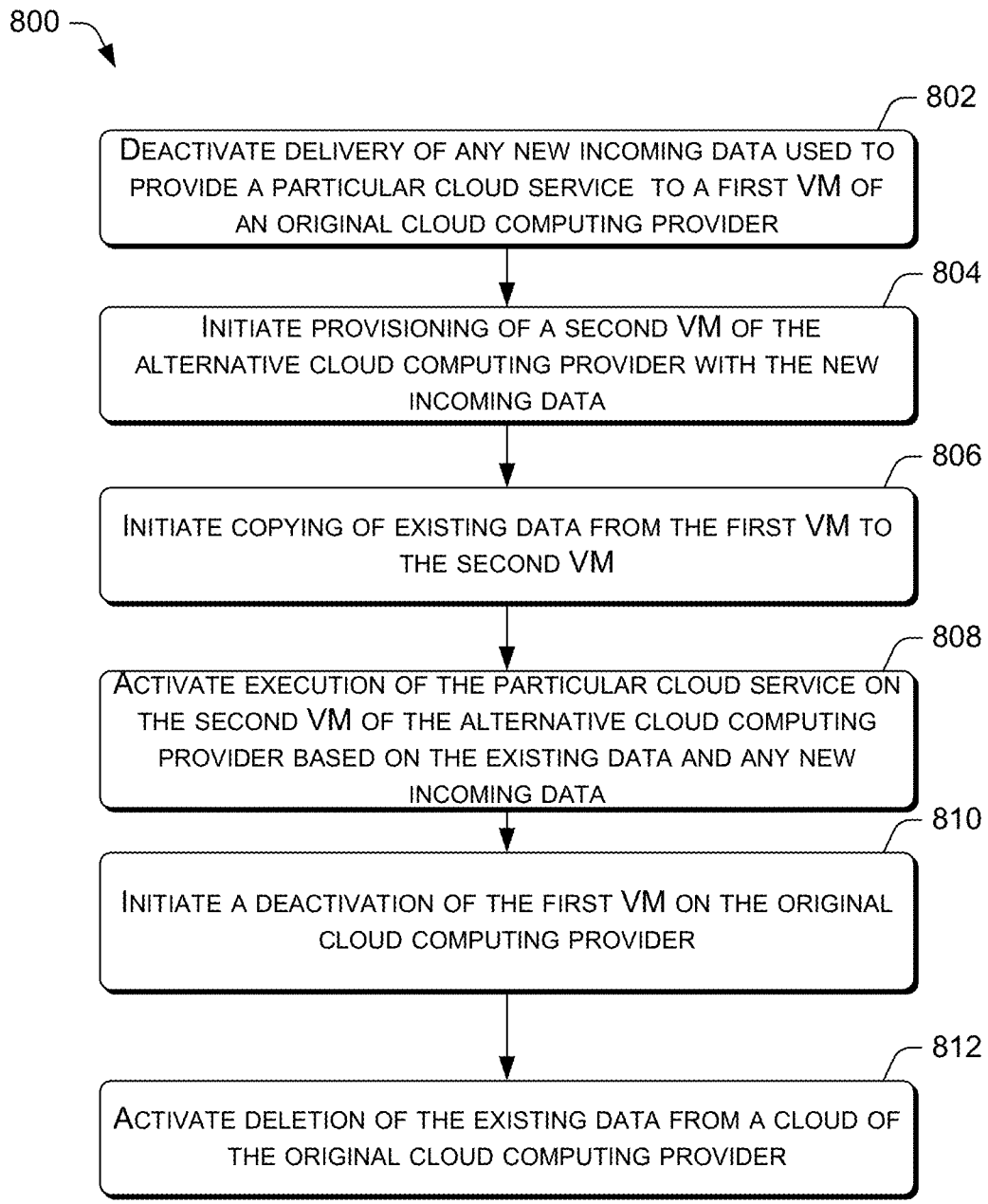
FIG. 8 is a flow diagram of an illustrative process for transferring data from the virtual machine of an original cloud computing provider to the virtual machine of an alternative cloud computing provider.

FIG. 8 is a flow diagram of an illustrative process 800 for transferring data from the virtual machine of an original cloud computing provider to the virtual machine of an alternative cloud computing provider. The process 800 may be implemented so that the alternative cloud computing provider may take over the provisioning of a particular cloud service from the original cloud computing provider. At step 802, the application host 630 may deactivate delivery of any new incoming data to a first virtual machine of an original cloud computing provider, in which the incoming data is used to provide a particular cloud service. In various embodiments, the particular cloud service may be the storage of data collected by multiple user devices, distribution of the data to multiple client devices, the analysis of data, the modification of data, and/or so forth. The incoming data may be data assets and metadata that are provided by one or more user devices to the application host 630.

At step 804, the application host 630 may initiate the provisioning of the second virtual machine of the alternative cloud computing provider with the new incoming data. In various embodiments, the new incoming data may include data assets that are captured by user devices and/or the metadata associated with the data assets. The second virtual machine may write the new incoming data to databases in the second virtual machine. At step 806, the application host 630 may initiate copying of the existing data from the first virtual machine to the second virtual machine. The existing data being copied may be data that are used to provide the particular cloud service.

At step 808, the application host 630 may activate the execution of the particular cloud service on the second virtual machine of the alternative cloud computing provider based on the existing data and any incoming data. The execution may cause the second virtual machine to provide the particular cloud service in the same fashion as the first virtual machine of the original cloud computing provider. In various embodiments, the execution may be followed by switching one or more computing devices to receiving the particular cloud service from the second virtual machine of the alternative cloud computing provider instead of the first virtual machine. For example, the application host 630 may automatically modify a data output directory path used by a recipient computing device to point from the first virtual machine to the second virtual machine.

At step 810, the application host 630 may initiate a deactivation of the first virtual machine on the original cloud computing provider. In various embodiments, the application host 630 may send a deactivation command to a cloud of the original cloud computing provider. In response, the cloud of the original cloud computing provider may deactivate the first virtual machine. At step 812, the application host 630 may activate the deletion of the existing data from a cloud of the original cloud computing provider. A software infrastructure component of the cloud (e.g., an operating system, a virtual file server) may perform the deletion in response to a deletion command from the application host 630. Such deletion may ensure that any new creation of the first virtual machine is unable to process the same data or provide the particular cloud service.

Figure 9:
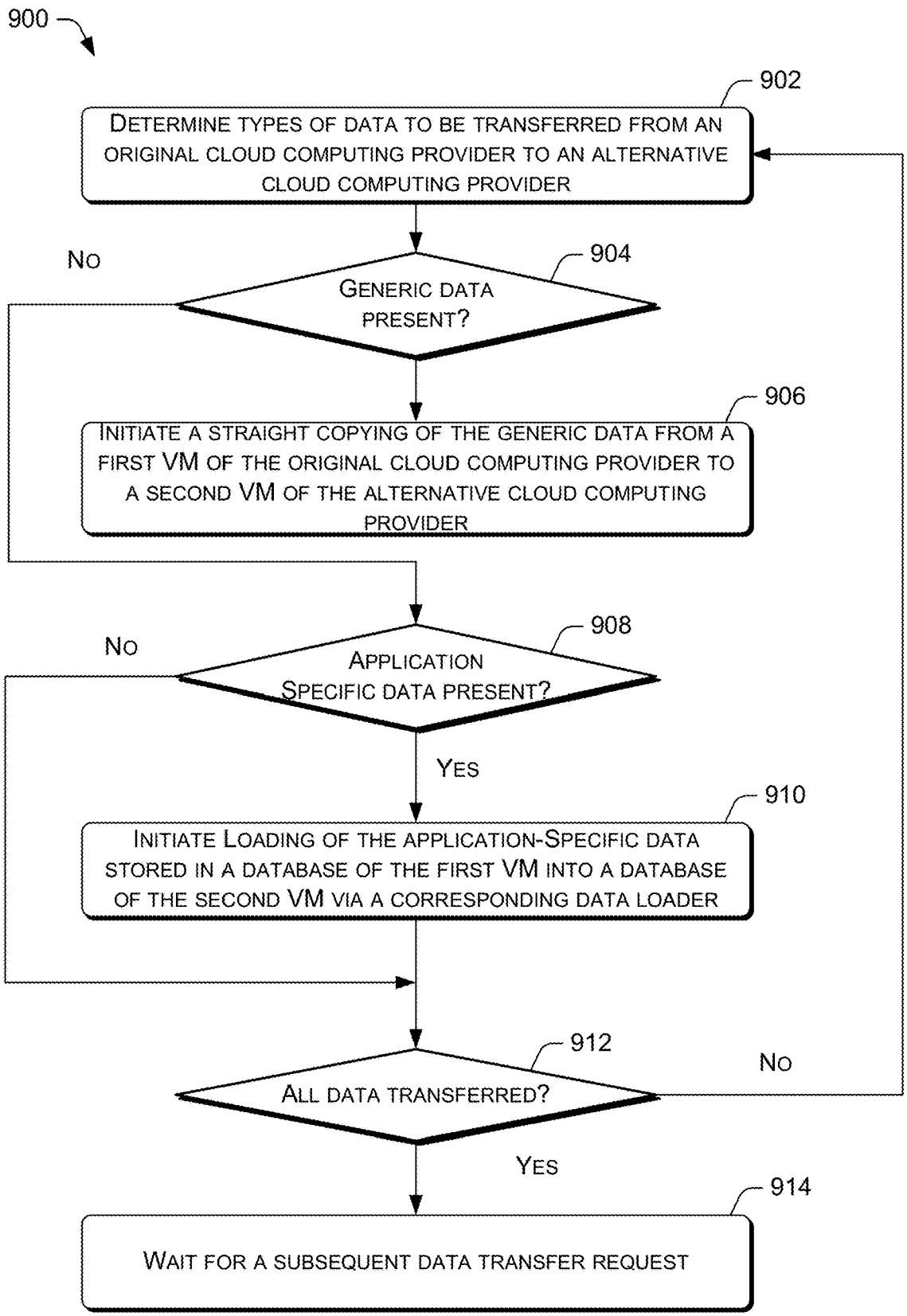
FIG. 9 is a flow diagram of an illustrative process for transferring generic and application-specific data from the virtual machine of an original cloud computing provider to the virtual machine of an alternative cloud computing provider.

FIG. 9 is a flow diagram of an illustrative process 900 for transferring generic and application-specific data from the virtual machine of an original cloud computing provider to the virtual machine of an alternative cloud computing provider. In some instances, the process 900 may further illustrates step 806 of the process 800. At step 902, the application host 630 may determine types of data to be transferred from an original cloud computing provide to an alternative cloud computing provider. The data to be transferred may be stored in a database that is present in a virtual machine. The virtual machine may be created by a cloud of the original cloud computing provider. The types of data may include generic data and application-specific data. In various embodiments, the application-specific data may be data that are used by the server applications 650, the custom applications 654, and/or data that are stored in proprietary data formats in the databases 652. In contrast, generic data may include any other data that are used by the virtual machines to provide the particular cloud service.

At decision step 904, if the application host 630 determines that generic data is present ("yes" at decision step 904), the process 900 may proceed to step 906. At step 906, the application host 630 may initiate a straight copy of the generic data from a first virtual machine of the original cloud computing provider to a second virtual machine of the alternative cloud computing provider. In various embodiments, the straight copy may be accomplished by the second virtual machine via reading of the existing data from databases of the first virtual machine and writing the data to databases on the second virtual machine. However, if the application host 630 determines that no generic data is present ("no" at decision step 904), the process 900 may proceed to decision step 908. At decision step 908, the application host 630 may determine whether the application-specific data is present. Accordingly, if the application-specific data is present ("yes" at decision step 908), the process 900 may proceed to step 910.

At step 910, the application host 630 may initiate loading of the application-specific data stored in a database of the first virtual machine into a database of the second virtual machine via a corresponding data loader. In various embodiments, the application host 630 may accomplish this task by directing the VM configuration utility 658 to supervise the data loader in conjunction with the instantiation of the second virtual machine. Subsequently, the process 900 may proceed to decision step 912. However, if the application-specific data is not present ("no" at decision step 908), the process 900 may proceed directly to decision step 912. At decision step 912, the application host 630 may determine whether all data have been transferred. For example, new incoming data may arrive into the first virtual machine as the data is being transferred to the second virtual machine. Alternatively, there may be application-specific data present for multiple applications and/or multiple databases that are to be loaded individually.

Thus, if the application host 630 determines that all data have been transferred ("yes" at decision step 912), the process 900 may proceed to step 914. At step 914, the application host 630 may wait for a subsequent data transfer request. However, if the application host 630 determines that there are additional data to be transferred ("no" at decision step 912), the process 900 may loop back to step 902.

Figure 10:
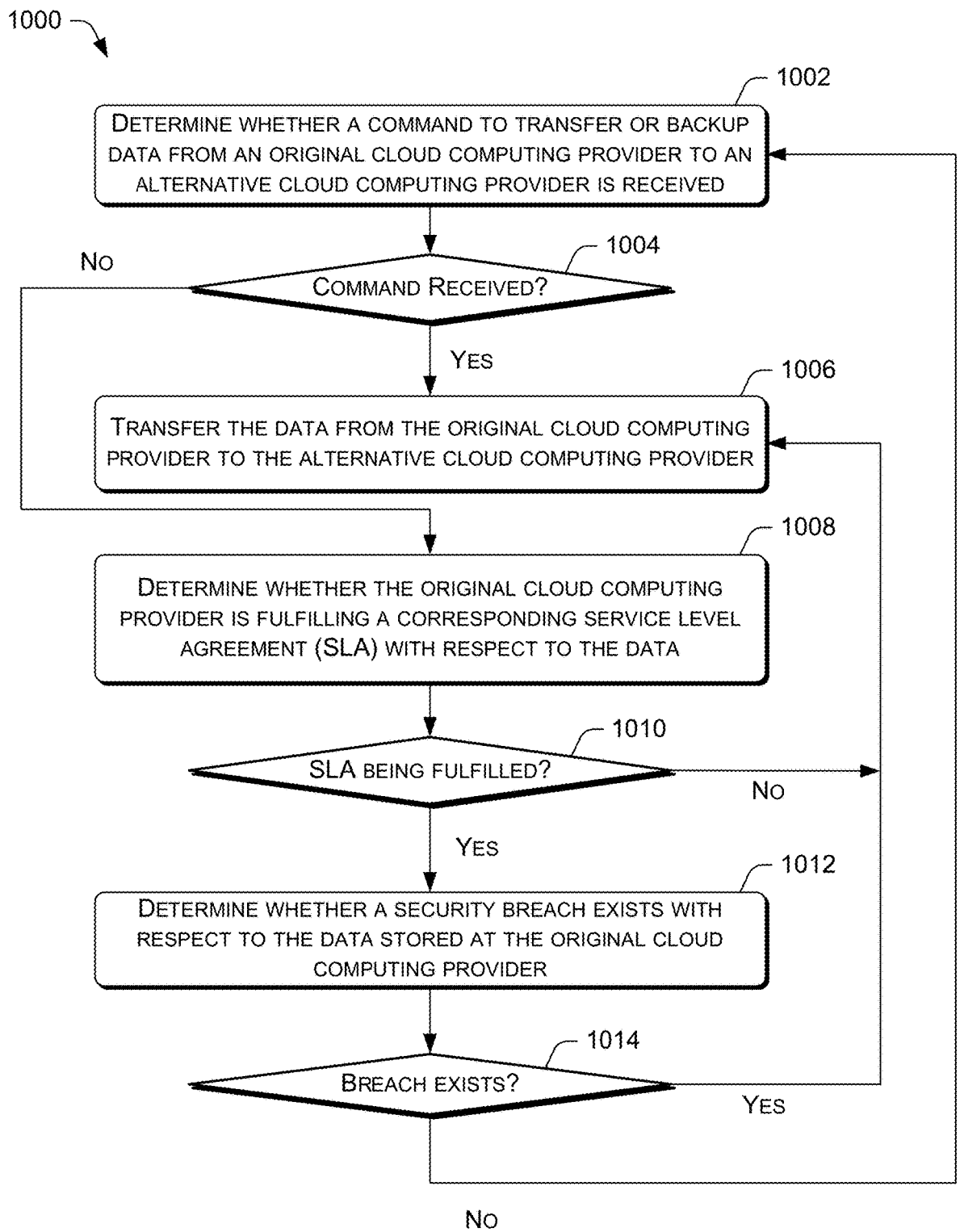
FIG. 10 is a flow diagram of an illustrative process for determining whether to transfer data from a cloud computing provider to another cloud computing provider.

FIG. 10 is a flow diagram of an illustrative process 1000 for determining whether to transfer data from a cloud computing provider to another cloud computing provider. In step 1002, the application host 630 may determine whether a command to transfer or backup data from an original cloud computing provider to an alternative cloud computing provider is received. In various embodiments, the command may be inputted by a human administrator or generated by a data backup scheduler component of the application host 630. Accordingly, if the application host 630 determines that the command is received ("yes" at decision step 1004), the process 1000 may proceed to step 1006.

At step 1006, the application host 630 may transfer the data from the original cloud computing provider to the alternative cloud computing provider. In various embodiments, the data may be transferred for the purpose of backing up the data to the alternative service provider or transfer the ability to provide a particular cloud service to the alternative service provider. However, if the application host 630 determines that no such command is received ("no" at decision step 1004), the process 1000 may proceed to step 1008.

At step 1008, the application host 630 may determine whether the original cloud computing provider is fulfilling a corresponding SLA with respect to the data. In various embodiments, the application host 630 may make such a determination based on received or calculated metrics. The metrics may include data throughput, data latency, data processing speed, mean time between failures (MTBF), error resolution rate, error response time, and/or so forth, in which thresholds and requirements for these metrics may be specified by the SLA. Accordingly, if the application host 630 determines that the SLA is not being fulfilled ("no" at decision step 1010), the process 1000 may loop back to step 1006. However, if the application host 630 determines that the SLA is being fulfilled ("yes" at decision step 1010), the process 1000 may proceed to step 1012.

At step 1012, the application host 630 may determine whether a security breach exists with respect to the data stored at the original cloud computing provider. In various embodiments, the security breach may involve current or imminent unauthorized and/or undesired access to the data stored with the cloud computing provider. Accordingly, if the application host 630 determines that a security breach exists ("yes" at decision step 1014), the process 1000 may loop back to step 1006. However, if the application host 630 determines that no security breach exists ("no" at decision step 1014), the process 1000 may loop back to step 1002 so that the application host 630 may standby to initiate another data transfer.

Figure 11:
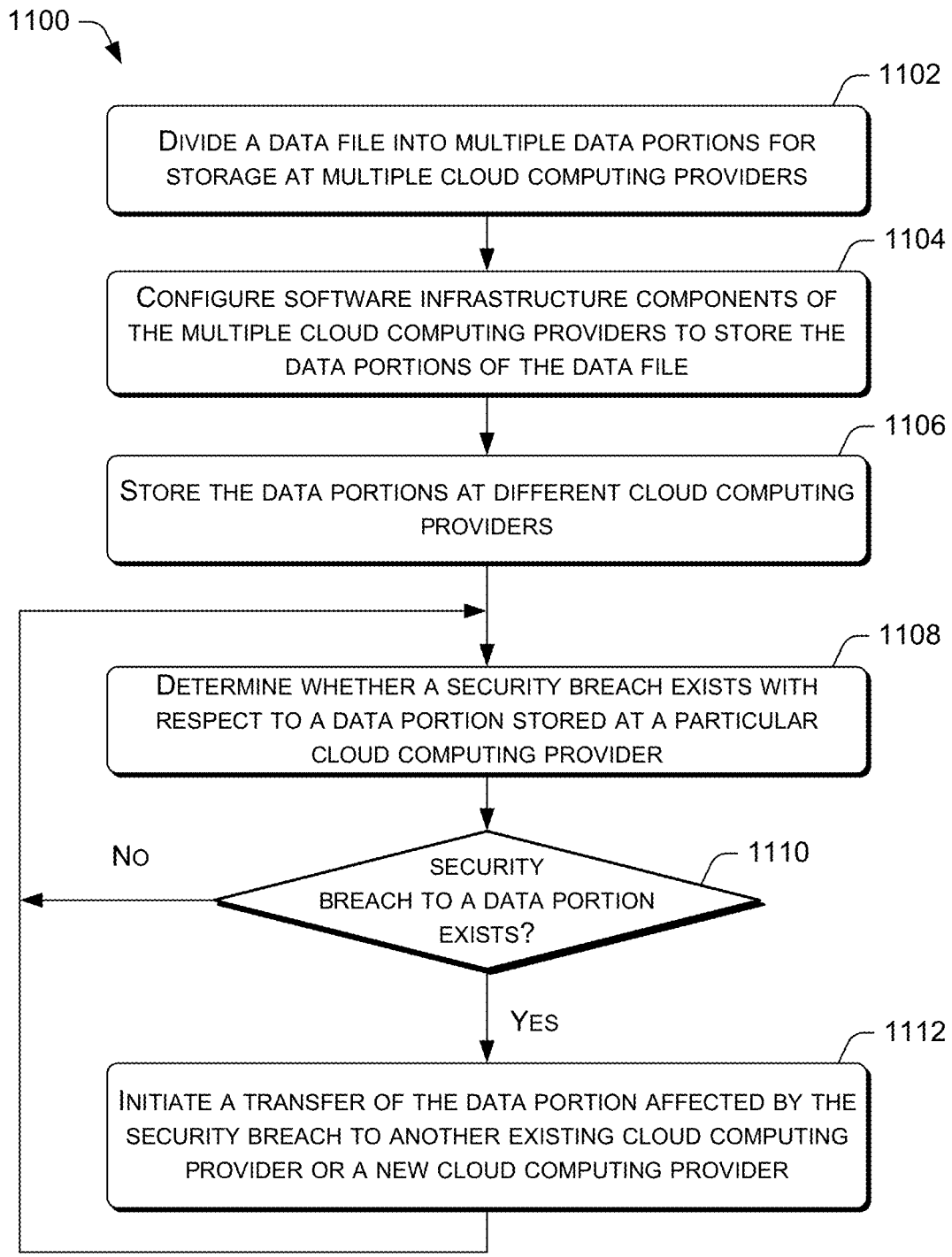
FIG. 11 is a flow diagram of an illustrative process for storing data portions of a data file at multiple cloud computing providers to enhance data security.

FIG. 11 is a flow diagram of an illustrative process for storing data portions of a data file at multiple cloud computing providers to enhance data security. At step 1102, the application host 630 may use a file splitter or a file demultiplexer algorithm to divide a data file into multiple data portions for storage at multiple cloud computing providers. For example, a first cloud computing provider may operate the cloud 610, while a second cloud computing provider may operate the cloud 620. The data file may contain data for a data asset, a document, and/or so forth.

At step 1104, the application host 630 may configure the software infrastructure components of the multiple cloud computing providers to store the data portions of the data file. In various embodiments, the software infrastructure components of each cloud computing provider may be configured in accordance with a common infrastructure component specification that is received by the application host 630.

At step 1106, the application host 630 may store the data portions at different cloud computing providers. For instance, a first data portion may be stored at the cloud 610 of the first cloud computing provider, while a second data portion may be stored at the cloud 620 of the second cloud computing provider, and so on. However, in other instances, any number of data portions may be stored at any number of cloud computing providers, as long as less than all of the data portions of the data file are stored at a single cloud computing provider.

At step 1108, the application host 630 may determine whether a security breach exists with respect to a data portion stored at a cloud computing provider. In various embodiments, the security breach may involve current or imminent unauthorized and/or undesired access to the data stored with the cloud computing provider. Accordingly, if the application host 630 determines that a security breach exists ("yes" at decision step 1110), the process 1100 may proceed to step 1112.

At step 1112, the application host 630 may initiate a transfer of the data portion affected by the security breach to another existing cloud computing provider of the multiple cloud computing providers or a new cloud computing provider. In instances in which the data portion is transferred to a new cloud computing provider, the application host 630 may configure the software infrastructure components of the new cloud computing provider according to the infrastructure component specification. However, if the application host 630 determines that no security breach exists ("no" at decision step 1110), the process 1100 may loop back to step 1108 so that the application host 630 may standby to detect another security breach.

Figure 12:
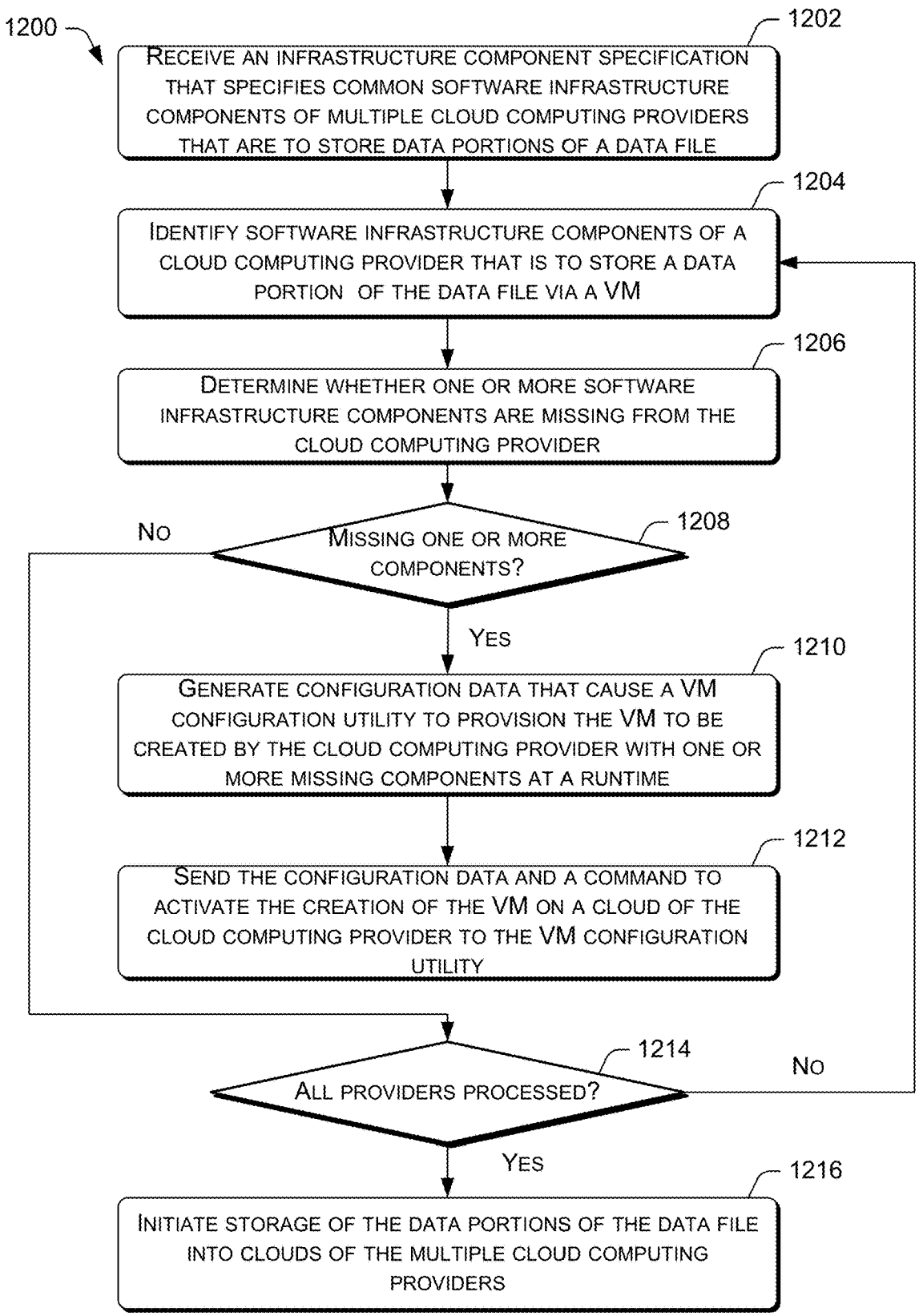
FIG. 12 is a flow diagram of an illustrative process for creating and provisioning virtual machines of the multiple cloud computing providers to store data portions of a data file.

FIG. 12 is a flow diagram of an illustrative process for creating and provisioning virtual machines of the multiple cloud computing providers to store data portions of a data file. The process 1200 may further describe the step 1104 of the process 1100. At step 1202, the application host 630 may receive an infrastructure component specification that specifies common software infrastructure components of multiple cloud computing providers that are to store data portions of a data file. In various embodiments, the infrastructure component specification may be in the form of a configuration file that is parsed by the application host 630. The software infrastructure components may include an operating system, a hypervisor, a virtual file server, server applications, databases, service platforms, and/or custom applications. The first virtual machine may be using the data to provide a particular cloud service (e.g., data distribution, data analysis, etc.) to one or more user devices.

At step 1204, the application host 630 may identify infrastructure components of a cloud computing provider that is to store at least a portion of the data via a virtual machine. The virtual machine is to be created by the alternative cloud computing provider. At step 1206, the application host 630 may determine whether one or more infrastructure components are missing from the cloud computing provider. In various embodiments, the application host 630 may accomplish this task using a differentiation algorithm to compare the software infrastructure components of the cloud computing provider against the infrastructure component specification. Accordingly, if the application host 630 determines that the cloud computing provider is missing one or more software infrastructure components ("yes" at decision step 1208), the process 1200 may proceed to step 1210.

At step 1210, the application host 630 may generate configuration data that cause a VM configuration utility to provision the virtual machine to be created by the alternative cloud computing provider with one or more missing components at a runtime of the virtual machine. At step 1212, the application host 630 may send the configuration data and a command to activate the creation of the virtual machine on a cloud of the cloud computing provider to the VM configuration utility. In various embodiments, the VM configuration utility 658 may generate an implementation file based on the configuration data relayed by the application host 630. The execution of the implementation file may cause the VM configuration utility 658 to initiate a creation of a virtual machine. As a part of the instantiation of the virtual machine, the VM configuration utility 658 may obtain the one or more software infrastructure components that the alternative cloud computing provider lacks from one or more other providers.

However, if the application host 630 determines that the cloud computing provider is not missing one or more software infrastructure components ("no" at decision step 1208), the process 1200 may proceed to decision step 1214. At decision step 1214, application host 630 may determine whether all of the multiple cloud computing providers are processed. Accordingly, if all of the providers are processed ("yes" at decision step 1214), the process 1200 may proceed to step 1216. At step 1216, the process 1200 may initiate storage of the data portions of the data file into clouds of the multiple cloud computing providers. In various embodiments, a data portion may be stored in a virtual machine following the VM configuration utility 658 commanding the cloud computing provider to create the virtual machine and provisioning the virtual machine with the one or more missing software infrastructure components from another cloud computing provider. However, if the application host 630 determines that not all of the multiple cloud computing providers are process ("no" at decision step 1214), the process 1200 may loop back to step 1204, such that the software infrastructure components of another cloud computing provider may be identified.

Exemplary Client Software Platform

Figure 13:
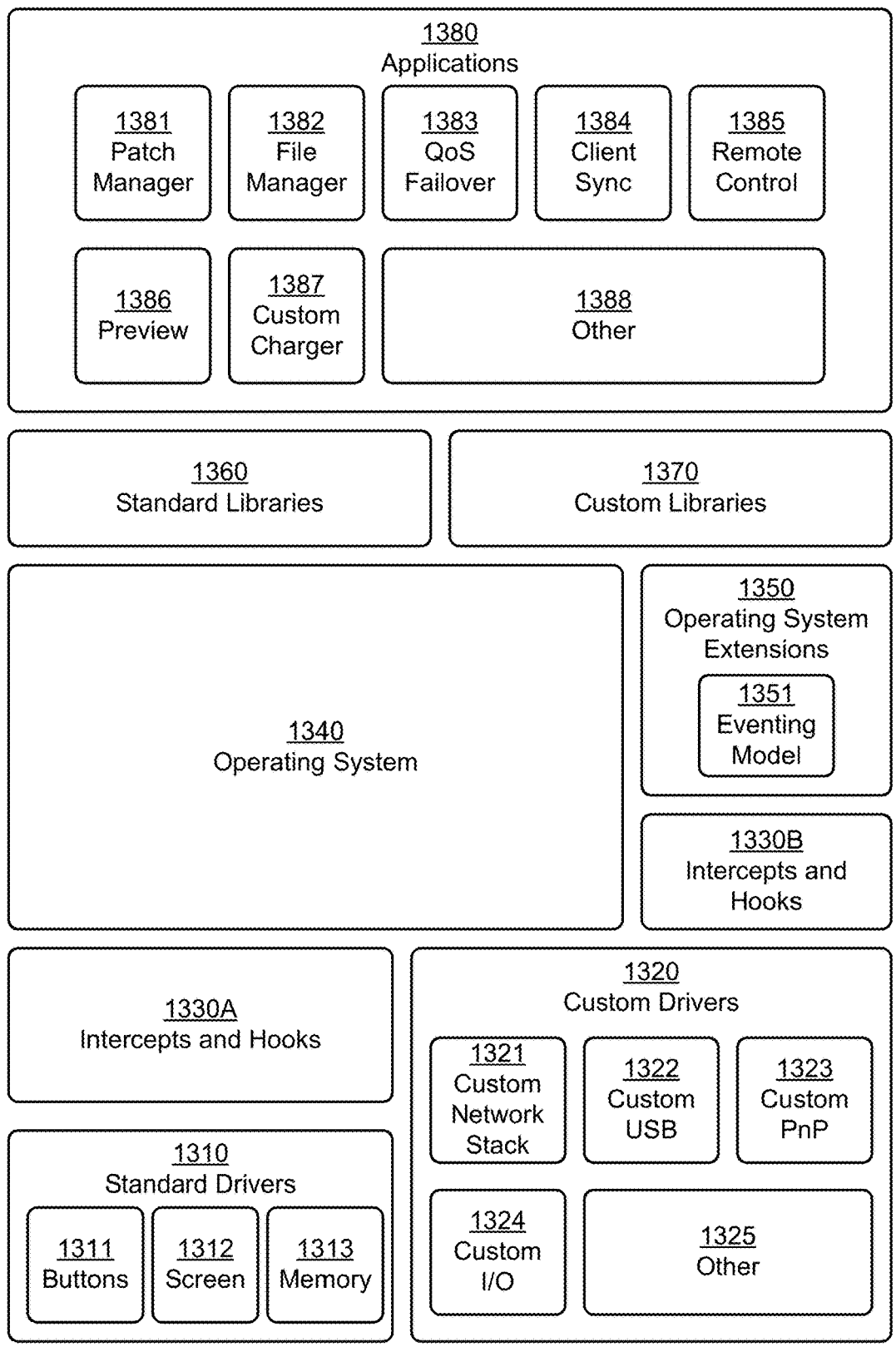
FIG. 13 is a diagrammatic illustration showing key components of software for an exemplary mobile client in accordance with various embodiments for correlating media for distributed services.

FIG. 13 illustrates an exemplary client software platform 1300. The client software platform is based on an ordinary cell phone software stack. However, to support the custom applications, at each stage, a corresponding custom layer may be added. The main hardware interface may be the device drivers 1310 and 1320. Standard drivers 1310 provide functionality to stock hardware. However, custom drivers 1320 may be required for custom hardware. Typically drivers will communicate with the cell phone operating system 1340. Examples include SYMBIAN™ and ANIDROID™, the operating system for the Open Handset Alliance. The operating system 1340, including the operating system kernel may require extensions 1350 to provide support for custom software events, as an example. To provide the necessary information to the operating system 1340 and the extensions 1350, software "shims" 1330A and 1330B may intercept and hook notifications from the drivers and may provide alternative functionality. Standards libraries 1360 may be built upon the operating system.

For custom functionality, the exemplary platform may include custom libraries 1370, mostly exposing programmatic support for the software eventing model 1351, and to custom hardware as exposed by the custom drivers 1320. Finally, applications 1380 may be built on top of the libraries 1370. The following discussion will cover each of these areas in more detail.

Standard drivers 1310 may include drivers for stock cell phone hardware including, but not limited to, buttons 1311, screen 1312, and memory 1313. There may be other stock hardware, including e.g., a GPS receiver (not shown).

Custom drivers 1320 may include drivers to support non-stock hardware for a cell phone. Custom drivers may be included in various embodiments by which a mobile client comprises a cell phone with additional hardware functionality.

One example of a custom driver 1320 is a custom network stack 1321 to compensate for the presence of a partial network stack, as in various cell phone embodiments. However, full implementations are to support functions typically not on a cell phone including Wi-Fi connectivity, FTP, to name a few.

Other examples of custom driver 1330 include a custom USB implementation 1322 and a custom Plug 'n Play ("PnP") implementation 1323. Not all cell phones support PnP, which is the automatic installation of hardware drivers and automatic configuration and provisioning thereof. However, some cell phones may have additional hardware added for telemetry and metadata purposes. A full USB stack 1322 and support for PnP 1323 may provide such functionality in various embodiments. As USB is not the only serial interface stack, it optionally may be replaced with some other serial data interchange stack.

Standard drivers 1310 and custom drivers 1320 may serve to forward communications to the operating system 1340. Generally there will be an event queue and a series of modifiable event handlers (not shown). Modification of the event handlers may include a recompilation of the operating system 1340. An alternative is to create extensions 1350 to the operating system 1340 to isolate any necessary custom functionality. This includes a custom software eventing model 1351.

Software events are different from the physical events that may be captured via media and multimedia, in accordance with the various embodiments described herein. Other terms for software events include "triggers" and "notifications." A software event may include a message that software sends when some occurrence discernable by software occurs. An example includes a hardware button being pushed, a driver triggering a software event that sends a message to all applications subscribing to the event for which a button has been pushed. If an application has an event handler, that event handler will contain functionality as to what the application should do when a button is pushed.

A software eventing model may support software events for custom hardware. For example, if a custom driver provides an interface for an RFID trigger, the custom driver may send a notification to the operating system extension's internal event queue. The internal event queue may then forward the notifications through custom libraries 1370 to application 1380. The application 1380 may then handle the event of the RFID trigger by turning storing the camera's preview buffer and starting the record function of the camera. Alternatively, software events may be processed via a modification of the operating system's 1340 event queue. Additionally, event notifications from applications 1380 may be disseminated via the software eventing system 1351.

The standard drivers 1310 preferably are not modified, or are modified as little as possible and custom drivers 1320 should be isolated from the operating system as much as possible. To enable custom eventing, in some cases, the communications may be intercepted or hooked by module 1330A for the standard drivers and 1330B for the custom drivers. For example, if a particular button sequence is to bypass the operating system and perform a custom function such as a triggering a hotkey mode, it may be necessary to intercept the button pushes and redirect execution to a hotkey executable. Further by way of example, if a combination of the default operation and a custom option is required, the button pushes can be simply hooked thus passing through the push notifications to the operating system at the same time triggering a custom button push software event handler.

The operating system 1340 and the operating system extensions 1350 generally will expose their functionality via an application programming interface (API). Standard libraries 1360 generally provide function calls or object models to aid programming applications. Standard libraries 1360 generally are distributed along with the operating system. Library extensions, that is custom libraries 1370 provide function calls or objects models to support custom hardware, operating system extensions 1350, or to provide new additional functionality on top of the original operating system 1340.

There is a wide range of applications 1380 now enabled by this extended platform as will be described as follows.

(i) Patch Manager

Patch manager 1381 is an application that handles updates for the drivers and installed software. There are two ways of patching. The first optimizes saving memory, the second optimizes versioning. For both versions, the flash memory contains a lookup table mapping locations in memory for functions. When an application calls a function, it goes to a lookup table that was populated by the table mapping from flash. In this way, the function can proceed to the location of the function and properly execute.

The first example of patching stores the lookup table values in a well known location. It then stores drivers, the operating system, applications, and any other binaries in other locations of the memory. Each binary is allocated more memory than it currently needs in order to account for future patches. When the patch manager receives notice, which includes all new binaries and a new lookup table, perhaps over the network, or via an SMS message, the patch manager triggers a software event. The software event shuts down all software except for those necessary for patch functions. The patch manager first overwrites the lookup table, and then overwrites all binaries with the new binaries. The patch manager then forces a reboot. The reboot then restarts the mobile client, populates the software lookup table with the lookup table in flash. When an application calls a function, it then will go to the new location and to the new binary.

While the first example conserves memory, it does not provide provision for falling back in the event bad patches are installed or patches were improperly installed. In a second example of a patch manager, the same triggers and events are used as in the first example. However, additionally, the location of the current lookup table is stored. At a well known location, several bytes of empty storage store each new location of lookup table. The original lookup table address is in the first location. The lookup table of the first patch is in the second location, and so on. Whenever a patch is installed, lookup table and all binaries are stored contiguously. Upon reboot, the operating system looks for the last lookup table and then installs the lookup table into software from that location. In the event a patch has to be backed out, the patch manager can decrement the list of addresses of lookup table versions, reload the older lookup table, and in doing so revert back to the older software.

(ii) File Manager

File manager 1382 is an application that provides advanced file management for on board removable storage. Typically when removable storage such as memory sticks are in a cell phone, the assumption is that the user will remove the memory stick and place it in a PC to remove and otherwise manage files. However, for scenarios such as security cameras where removing the memory stick may take long periods of time, an ability to manage files as not to run out of memory is required. To address these requirements, the file manager 1382 contains four main functions: (1) deleting files upon upload, (2) round robin deletion, (3) metadata tagging upon upload or download, and (4) enumeration of data assets.

For the first function, as files are written to media, eventually a notification, perhaps from SMS will trigger uploading all files not currently open. Where a file is open, optionally the trigger will force a closing of a file and a reopening, for example with the onboard video camera is currently recording.

For the second function, where uploading is sporadic or non-existent, the file manager may maintain a queue of files and implement a first stored first out memory management approach. Specifically, when memory is no longer available, the oldest files will be deleted and that space allocated for a new file. The file manager may implement packing and compression algorithms as well.

For the third function, upon upload or download the file manager checks the Event ID of the data asset. If it is null, it populates the metadata field with the current Event ID on the mobile client. Where the Event ID is associated with other metadata, for example the name of the event, that field is populated if null. In the alternative, it may prevent upload or download.

For the fourth function, the file manager provides not only for enumeration of data assets, but simple search via metadata. The file manager maintains a table of data assets on the machine and maintains a list of metadata fields and offsets. When request, for example from SMS, or alternatively via a network requires a list of data assets matching metadata criteria, it sequentially iterates through all the data assets in the data asset table and retrieves the file name if the data asset matches. It then writes the file name into a text file. The text file is then returned over the data connection. The text file may be formatted with XML or with a proprietary format to aid enumeration and presentation on the receiver of the file.

(iii) Quality of Service ("QoS") Failover

A QoS Failover application 1383 manages multiple media inputs, for example a video camera and a microphone. Consider the case where the mobile client is in a police car and the police officer is wearing a wireless video camera and a wireless microphone configured for the platform as disclosed. Further consider the case such that the video wireless connection has a lower range than the microphone wireless connection. While the police officer is near the car, both video and microphone are streaming data. When the officer exceeds the distance for the video connection, but not the microphone, the QoS Failover application can cut-out storage only for microphone. When the officer then exceeds the distance for microphone, the QoS Failover application can then place a marker in the file indicating no receipt. When the police officer returns to the car, the microphone and video can recommence recording according to range.

(iv) Client Synchronization ("Client Sync")

Consider the case where data assets from multiple mobile clients are to be correlated. The Client Sync application provides the client side support to aid consistency and reliability of media and metadata across the clients, hence the term sync. Upon activation, the Client Sync registers the mobile client with a web service or equivalent. The web service provides an Event ID and in turn the mobile client via the Client Sync uploads data assets to the web service. The data assets are tagged with the Event ID. The Client Sync also provides location samples to the web service, as to allow for tracking of the mobile client. When data assets are uploaded, the Client Sync also appends to the data asset a checksum. Upon upload, the web service can validate the authenticity of the uploaded data asset. The checksum (also called a heartbeat) can also contain additional metadata. For its part, the web service can also provide additional metadata. For example, consider a law enforcement scenario with multiple officers. Each of the officers has a mobile client and already is associated with an Event ID. When a particular incident occurs, the web service can provide an Incident ID that gets associated with the officers proximate to the event. This Incident ID gets associated with all data assets uploaded until the web service rescinds the Incident ID. In this way, later the data assets associated with the Incident ID may be easily identified.

Identifying relevant mobile clients to send the Incident ID relies on knowing the location of the mobile clients. If an officer indicates that an incident has occurred, either through a hotkey or a message, the web service attempts to identify which other mobile clients with the same Event ID are proximate. Usually this may be done via GPS. However, as described in the hardware section above, GPS is prone to error from GPS signals bouncing off of buildings, location may alternatively be determined by triangulating signal strength or weakness from different cell towers with known locations. For relatively immobile clients, such as surveillance tower cameras, geolocation via IP address may be employed.

(v) Remote Control

The remote control application 1385 takes advantage of the full network stack on the mobile client. Consider the case where the mobile client has an IP address and is fully participating on a network. The remote control application contains a proxy to intercept remote instructions, either through SMS or from a direct IP connection to a remote site. Accordingly, a remote user can fully control the client, either for maintenance such as patching and upload of data assets.

(vi) Preview

The preview application 1386 is not an application to preview data. Rather it is an application to guarantee that media captured in the preview buffer of a video camera is recorded along with the rest of the event. On video cameras with preview, a memory buffer stores the first few seconds of data. This buffer could store an arbitrary amount of time. Upon recording, the video begins recording at the time of triggering, in other words at the start of the event to be recorded. However, for security cameras and other applications, it may be preferable to store the previous few seconds in the preview buffer as well to ensure complete recording. Accordingly, a RFID triggered security camera function in a mobile client configured with the platform as disclosed would store not only the event upon triggering the camera, but also the first 10 seconds. In this way, the video would store not only the event, but the precursor events that led to the event.

(vii) Custom Charger

Mobile devices such as the mobile client as disclosed require constant recharging. A custom charger application 1387 determines how much charge is left in the battery, and provides alerts when charge is low. Furthermore, in cases of inductance charging, the custom charger can store information about how much power is needed to recharge the battery. It could also store rules on detecting when charging coils were sufficient proximate and stable to trigger charging functions.

(viii) SMS Based Mobile Client Control

The ability to receive short message system (SMS) messages and trigger software events provides a general mechanism to remotely control a phone. Specifically, a mobile client that has an SMS capable transceiver may monitor SMS calls and perform software routines in responses. Specifically, one of the custom drivers 1325 could be an SMS driver to allow the ability to monitor SMS calls for custom commands. Calls to and from the SMS driver could be intercepted and hooked. When a predefined SMS message to a predefined location is received, it could trigger an event in event model 1351 which in turn could be utilized in an application 1388.

An alternative embodiment is to have a daemon application 1388 without the driver or event model to directly monitor SMS messages such that when a predefined SMS message to a predefined location is received it would perform a particular prespecified task.

An example application for monitoring SMS messages relates to law enforcement. A "stealth" recording feature may be implemented where a mobile client receives a SMS message which includes a phone number, the SMS message instructs the mobile client to start recording its environment and transmit the audio and/or video over the received phone number. Another SMS message could instruct the mobile client to stop recording and transmitting. Variations on this scenario where an SMS message instructs the mobile client to initiate a phone call but does not record, as to the type of media to transmit, and whether to use the calling number as the destination to transmit recorded media will be appreciated by one of ordinary skill in the art.

In particular, Table A as follows provides an exemplary mapping of events to SMS Messages to be interpreted a control instructions operative to control a mobile client's stealth recording function:

TABLE A

Event to SMS Mapping for Stealth Feature

| Event | SMS Message | Description |
| --- | --- | --- |
| Recording Start | #*77 | Start recording media |
| Call Start | #*27 + phone # | Initiate call to phone #. If phone # is not specified, then initiate call on the sender's phone #. |
| Recording/Call Start | #*7727 + phone # | Initiate call to phone # and start media recording. If phone # is not specified, then initiate call on the sender's phone #. |
| Recording Halt | #*74 | Terminate ongoing media recording. |
| Call Halt | #*24 | Terminate ongoing phone call. |
| Recording/Call Halt | #*7424 | Terminate the ongoing media recording and phone call. |

The mobile client may optionally send a response SMS message to the sender to confirm receipt of messages, proper operation of the client, or error messages. The SMS messages could be used as a protocol, including but not limited to triggering software events by the receiver. For example, an SMS acknowledgement for starting a call could trigger a software server to start receiving streaming media. Another example would be to receive an error SMS stating that a connection could not be established, and displaying the error message as part of a computer application.

The mobile client could receive SMS messages from any SMS source. These include but are not limited to other mobile devices and computer applications with a cell that could transmit SMS. Accordingly, protocols could be established over SMS between two mobile devices or with a custom computer application with capable of transmitting and receiving messages compliant with the SMS protocol.

Although the SMS messages above are merely exemplary, a sample session may be as follows. The mobile client receives an SMS message #*27 1-555-555-1234. In response, the mobile client starts a phone call with 1-555-555-1234, and immediately sends an SMS acknowledgement. The mobile client then receives an SMS message of #*77. The mobile client immediate starts recording video and audio. If the recording cannot be performed, the mobile client would send back an SMS error message to 1-555-555-1234. Periodically, the mobile client will upload files to an FTP server or other host. Alternatively, the calling number 1-555-555-1234 could provide a connection to an FTP server or equivalent. In another alternative, the server to which 1-555-555-1234 provides connectivity could trigger a streaming receipt upon receiving the acknowledgement SMS from the mobile client. The mobile client, upon receiving #*74 and send an acknowledgement SMS and would halt recording. A new recording could be established the mobile client receiving #*77 and again halted by the mobile client receiving #*74. Similarly upon receiving #*24, the mobile client would stop the call and send an acknowledgement.

(ix) Other

The above applications are not intended to be an exhaustive list of applications available. General utilities such as profile management (not shown) are available. A profile manager could store user information such as name to be used as default metadata. It could also store results about memory usage, bit rate, and resolution of stored media.

Commercial utilities can also be implemented on this platform. For example in the case of law enforcement, the mobile client might have a hot key for a police officer to indicate the officer has been attacked or shot. The video would trigger to store the preview buffer as well as the current events, and a central station could call for backup asking other police to converge on the attacked officer's GPS location.

Another law enforcement example is the alternative log on/password utility for undercover policemen. The alternative log on/password utility accepts two passwords. One password activates all the law enforcement functionality on the mobile client and displays a user interface specific to the law enforcement functionality. A second password simply displays an ordinary user interface expected on an ordinary cell phone, and additionally may activate a call for backup to the central station. Specifically, when an undercover policeman begins to be suspected to be a cop by those he or she is investigating, the policeman might be searched. Ordinarily, if the policeman is searched, and the mobile client is found, an inspection of the mobile client might arouse suspicions that the undercover policeman is a cop. The undercover policeman could enter a the second password into the alternative log on/password utility while would show the ordinary cell phone user interface and may help convince others that the undercover policeman is not a cop. In the meantime, the backup call to the central station would allow other policemen nearby to rescue the undercover cop.

Commercial utilities are not limited to law enforcement. The mobile client may support applications not specific to its video or networking capabilities. An example of a commercial utility not specific to law enforcement is where the client could store an audit function (not shown) that indicates that an unauthorized person has attempted to open the tamper-proof chassis. An example of using the SMS based mobile client control feature, such as used by the Stealth feature described above, is the case of a lost mobile client. The mobile client may host an application that upon receiving a message, such as an SMS text message, may un-mute a mobile client with its ringer turned off or alternatively may activate a mobile client that is in sleep mode, and then ring the device. In this way, a mobile client that has been misplaced in a room, where the ringer has been turned off or cannot otherwise be located simply by dialing the mobile client's number.

Exemplary Non-Client Software Applications

Once the data assets are tagged and available on a central store, they may be searched, correlated, tagged, edited, and presented either collectively via a web service, or to a closed set of users via a standalone application. The platform as disclosed gives rise to both types of applications.

Regarding a web service, groups may correspond to a group. The data reviewed by the groups, the content of the tags, and comments, made by the group may be queried for possible advertising. Because the group is self selecting, the fit of ad selection will improve a selection algorithm, based strictly on scanning media content, and metadata. In FIG. 2, the external data store 230 as provided with correlating metadata in 260 could be the correlation of advertising.

Network Operations Center

Figure 14A:
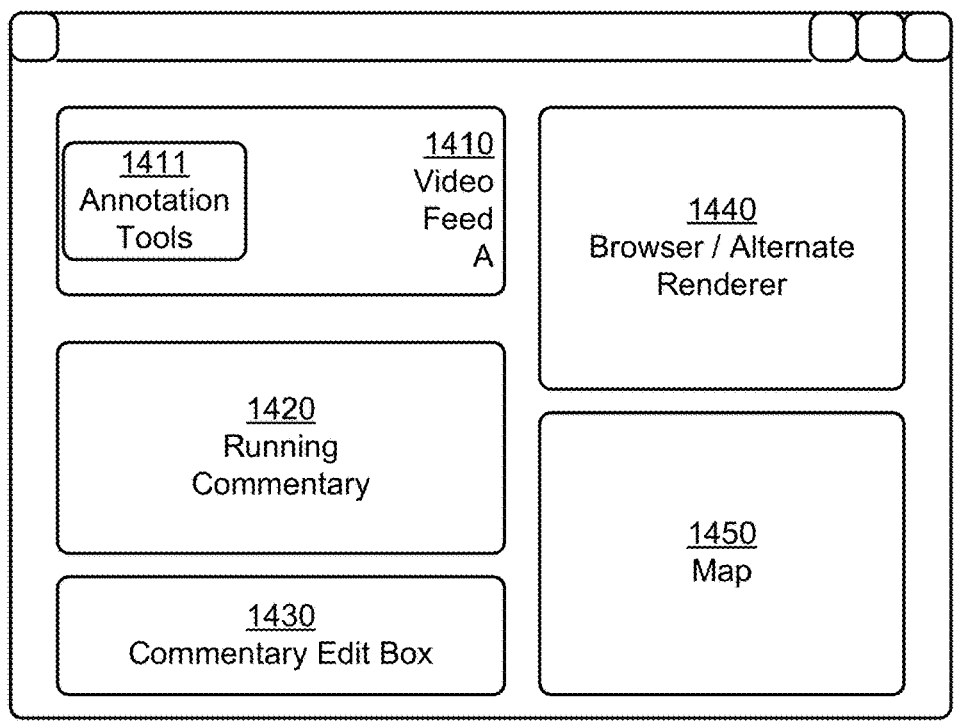
FIGS. 14A and 14B are diagrammatic illustrations of exemplary non-client software applications in accordance with various embodiments for correlating media for distributed services.
Figure 14B:
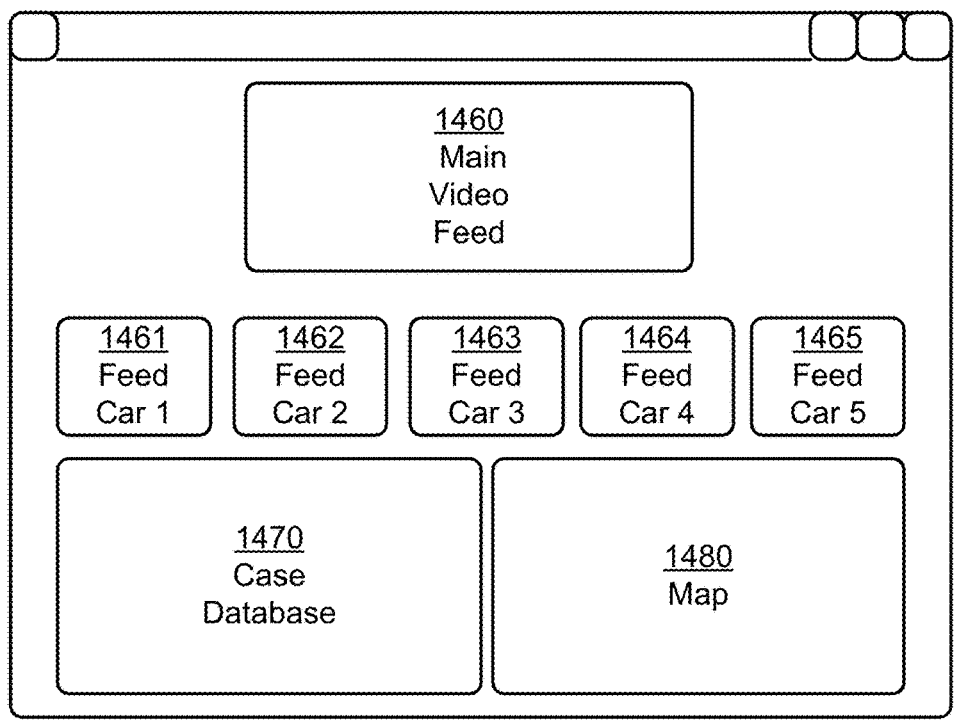

FIGS. 14A and 14B show a non-client based commercial application of the present platform, a network operations center ("NOC") of a law enforcement agency.

The NOC provides the capability of viewing individual videos. In video feed 1410, a video, or potentially another form of multimedia will be rendered. Annotation tools 1411 provide allow a user select one or more frames of running video, superimpose text, links, or other content, perhaps associating to a single object, such that the annotations render upon playback. Many tools presently exist for annotation of video and multimedia in general. Running commentary box 1420 provides a control with which to view commentary and commentary edit box 1430 provides a place to add additional commentary. Commentary text is persisted to a database and is associated with the multimedia file being rendered. Commentary is distinct from annotation in that the text is visible at all times in the running commentary box 1420 during rendering, whereas annotation only appears for specific frames and is superimposed over video as rendered in the video feed 1410. Associated videos, stills, text or other multimedia may render at the same time in browser 1440. For example, links from the annotation may render in browser 1440. Map 1450 may also display the location of the video. For example, if the video is by a police car in hot pursuit, the map may show a point rendering geolocation of the path of the pursuit itself.

The NOC has a "supervisor mode" shown in FIG. 14A, where data feeds, including video and audio, are coming from police officers proximate to an incident. Specifically, a police officer encounters an incident and presses a hot key telling the NOC that an incident is under way. The NOC can start an incident record and the police officer's feed appears in Car Feed 1, item 1451. Because it is the first feed, it also appears in the main video feed 1460. The map 1480 then centers on the location of that particular officer. The incident ID may be used as an Event ID.

On the map, the user can view other officers near to the incident and can either manually select other officers individually by clicking on the officers, or by dragging and dropping a bounding rectangle over the location. In the alternative, the application can use a predefined distance and automatically join other officers. Each joined officer's feed then shows in feeds 1461, 1462, 1463, 1464, 1465 and so on.

When an officer is joined, the officers' feed is associated with the Event ID and defines a group. Thus joining officers within a predefined distance and unjoining officers that go out of that predefined distance is an autogrouping feature.

The main video feed 1460 may display which of the feeds 1461, 1462, 1463, 1464 or 1465 to concentrate on. Alternatively, the main video feed may automatically switch between which officer is closest to the incident. Note that the video feed is not a composite view, but rather is an example of multiple videos being shown side by side based on correlation metadata.

If the data is being viewed after the fact, browser 1470 can bring up data from the law enforcement's case database. All media files with the Event ID may then be automatically tagged with the Case ID from the case database. In this way, data from the case database may be provided in an integrated view along with the media.

Law enforcement mobile clients have redundant local storage that is eventually uploaded for archiving. The application can provide a scanner function (not shown) that can manage uploading from the mobile clients, can tag the file as archived thus preventing redundant storage. In the alternative the scanner function could seek similar clips based on Event ID and location and timestamp information and delete redundant clips.

Because of the redundant storage, the NOC can provide security functions. Specifically the scanner function could also detect files tampered with by noting files with the matching data with different checksums. Additionally the NOC can check checksums on uploaded files to detect files intended to spoof the NOC.

Vertical Applications

The embodiments as disclosed may be used for both personal and commercial vertical applications. Advantages include but are not limited to: (1) reducing the price of camera monitoring via use of commoditized ever miniaturizing hardware and ever cheaper storage, (2) guaranteed full capture of an event by implementing preview buffers, (3) custom eventing where a camera may be triggered on an arbitrary event, (4) integration with other media via correlating metadata, and (5) integration with third party data via correlating metadata. The following sections will describe an exemplary application for personal use, an exemplary application for law enforcement, an exemplary application for security cameras, and will more generally enumerate other exemplary commercial scenarios.

Mobile NOC

The NOC application may be accessible via a web page on a notebook computer or other web enabled mobile device. Accordingly, all or portions of the NOC application may be viewed while in the field by a law enforcement officer.

An example application would be allowing a junior officer to patrol an area and to view indicia of incidents that occurred within a time frame in the present locale. In this way, the officer could more quickly learn the crime history of his location even though he had never been in the area before.

One embodiment would be to let an officer travel through a neighborhood. The officer would enter a time range of data to browse for the area, for example over the past year. The NOC application would pick up geolocation information of the roaming officer such as GPS location and display a map in the NOC would show pushpins indicating incidents within the specified time frame. The pushpins could be color coded, or have size or shape changes indicating the severity or recentness of the incidents. The officer could click on the event and view the video or associated media to learn more. In this way, the officer could familiarize himself as to the crime history of an area in near-real time.

The mobile NOC need not be in real-time. An officer could be in an area, and if he wished to learn more about the crime history of his location, he could open the NOC application and specify his current location and search for crimes within a time area and various search criteria. In this way, upon entering a crime scene the officer might find related crimes not readily discernable from the crime scene itself. For example if there was an assault at a crime scene, the officer could quickly identify other assaults nearby and consider suspects from those crimes as well as leads from the present crime scene.

Peer to Peer Scenario Embodiment

Video cameras, digital cameras, and digital recorders are to be ubiquitous among law enforcement officers. It is not uncommon for several policemen, each with their own camera or recorder, to be proximate to a crime in progress. The embodiments as disclosed enable sharing and the automatic correlating of the resulting data assets.

Figure 15:
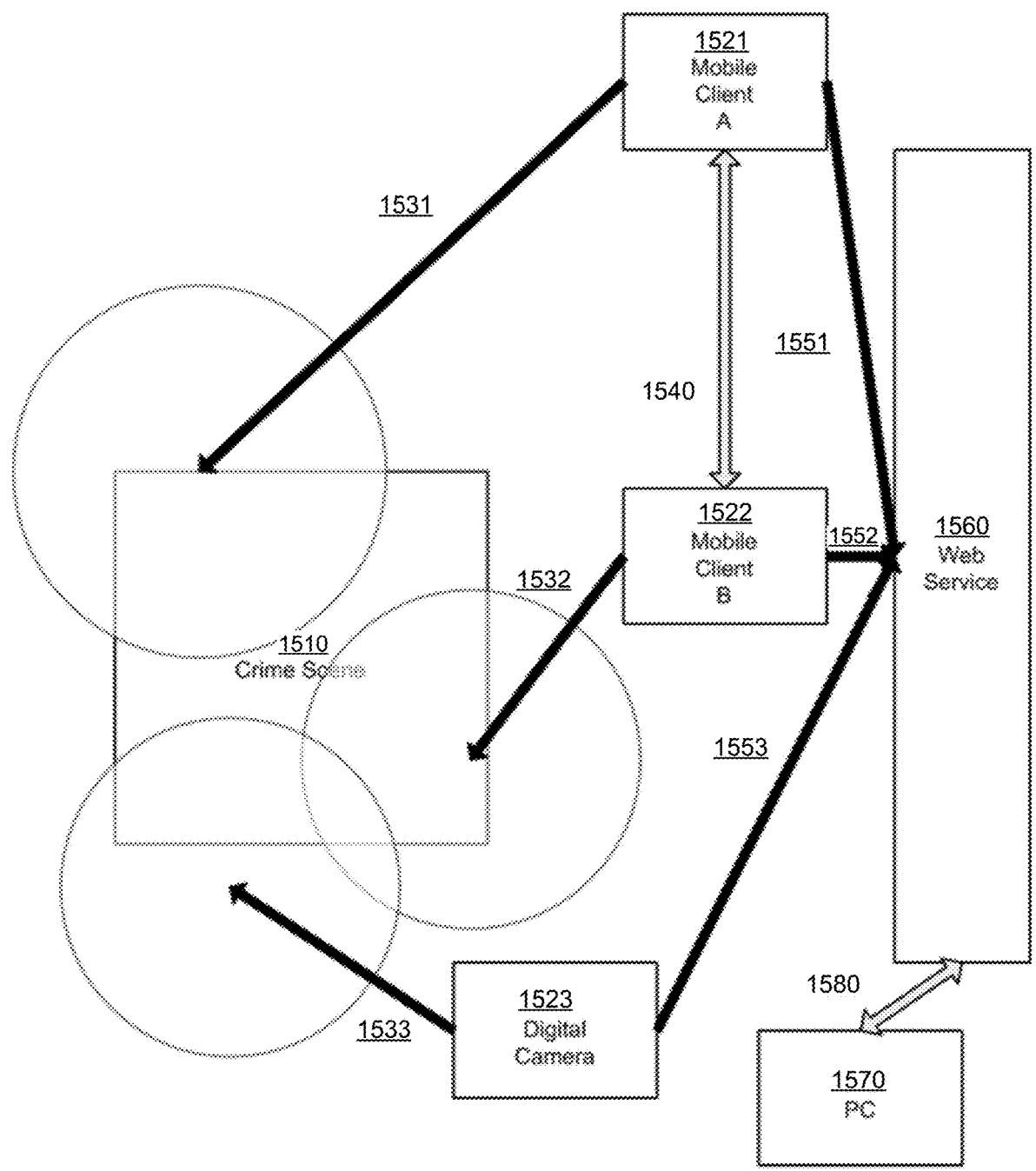
FIG. 15 is a diagrammatic illustration of the individual actors, hardware, and software applied to a personal use scenario of correlating media for distributed services.

FIG. 15 illustrates a scenario where three police officers, one with a personal camera 1523, the other two with cell phones enabled per the disclosure 1521, 1522, are proximate to the same crime scene 1510 in progress and start taking photos. The still shots capture different parts of the crime scene 1510, some overlapping, some not. Mobile client 1521 captures still shots 1531, mobile client 1522 captures still shots 1532, and digital camera 1523 captures still shots 1533.

Because mobile clients 1521 and 1522 are enabled per the disclosure, they are able to perform a peer to peer connection. Per the embodiment as disclosed, the initiating client 1521 identifies its device id, and enters a tag called "Robbery 1" and sends both to 1522 to use as an Event ID and as extra metadata. Mobile client 1522 sends an acknowledgement back to 1521, thus fully establishing data link 1540. Mobile client 1521 then downloads via IRDA all photos time stamped during a time frame corresponding to that of the crime from 1522, and mobile client similarly downloads all photos form 1521. Both clients automatically tag the photos moved through the data link 1540.

Standard camera 1523 is not configured per the present disclosure and cannot perform peer to peer transfer as mobile clients 1521 and 1522. Instead, the users of mobile clients 1521 and 1522 establish a group (not shown) on web service 1560 using mobile client 1521's Device ID as an Event ID. The user of standard camera 1523 then joins the group and when standard camera 1523 uploads chosen photos to the web service over data link 1553, the photos are automatically tagged with the Event ID and the meta tag "Robbery 1."

A user, such as a police supervisor back at headquarters, who is a member of the group (not shown) subsequently may access the web service 1560 via a PC 1570 over a data link 1580. The user may further upload related photos, such as getaway scenes of the robbery crime scene 1510 of persons of interest driving away, and again via the data link the photos are automatically tagged with the Event ID and the meta tag "Robbery 1." The user may also query, edit, tag, and combine photos on the PC.

It is to be emphasized that in the above scenario, media is not limited to photos. Video or audio could have been uploaded as well. The web service could have been a standalone application running on a network. Most importantly, the event, here exemplified by a crime scene 1510, need not have been at the same time or place. An Event ID could tie together any media regardless if they previously were related at all.

Law Enforcement Scenario Architecture Embodiment

Figure 16:
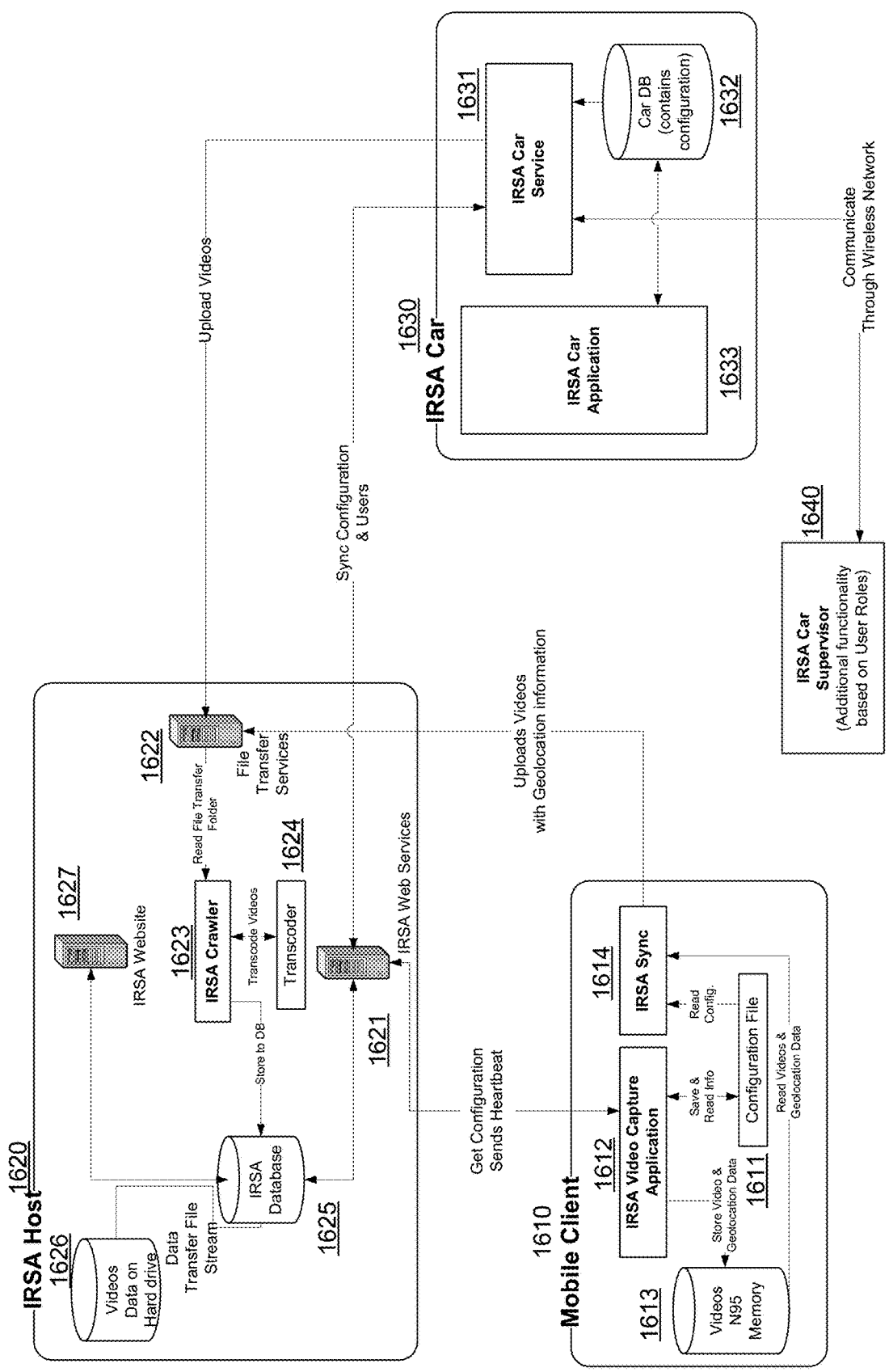
FIG. 16 is a diagrammatic illustration of the individual actors, hardware, and software applied to a law enforcement scenario of correlating media for distributed services.

FIG. 16 illustrates an exemplary law enforcement architecture embodiment. Consider the case where multiple active duty police officers are carrying mobile clients per the embodiments as disclosed. Police officers on foot carry a mobile client 1610, and police cruisers carry a mobile client 1630 in a chassis where the video camera is connected to the windshield, and the data is stored in a tamperproof, secure location. Exemplary tamperproof, secure locations include the trunk of the vehicle or glove box of the vehicle. In particularly hot climates, the trunk or glove box could be become so hot as to be beyond the operating temperature range of the data storage hardware portion may be in a secure cage integrated with the chassis of the vehicle, in a shaded and ventilated portion of the backseat. Alternatively, the tamperproof secure location could be integrated with cooling, such as an insulated cavity with refrigeration powered by electricity from the vehicle. Host 1620 provides data asset storage and archiving and backup services. Supervisor application 1640 is based on Wi-Fi connectivity and is hosted on a PC in a NOC. Both mobile clients 1610 and 1630 and the chassis of 1630 are based on the exemplary client described in FIG. 5 and supporting text. The supervisor application is as described in FIG. 14B and supporting text.

Host 1620 receives data assets from mobile clients 1610 and 1630 both in synchronous and via asynchronous upload. A web service 1621 can remotely configure a mobile client 1610 by checking the existing profile 1611 sending an updated profile via client application 1612. In general, client application 1612 functionality includes providing network connectivity to the host. The profile includes and is not limited to frequency of receiving an IP signal to poll the status of the mobile client. This signal is also called a heartbeat. Upon configuration, web service 1621 will send out a heartbeat according to that frequency, for example every 15 seconds. Client application 1612 will receive the heartbeat and return geolocation information, such as GPS coordinates. In the event of connectivity error, website 1627 would be able to indicate which mobile clients 1610 and 1630 have failed to connect or have not transmitted a heartbeat.

Because a mobile client 1610 and 1630 in the field broadcast geolocation information, a network operating center ("NOC") can get mobile location information from the host and know in real time the location of mobile units. This enables map applications. For example a NOC application may display selected units on a computerized view of a map, perhaps accessible via a website 1627. Alternatively, particular mobile clients may be searched by geolocation. By way of another example, the NOC can have the location of a crime scene and the current location of a mobile unit 1610 and automatically map the optimal route for the mobile unit to get to the crime scene. This feature is also known as a "Get Me There" feature.

As client application 1612 captures media, it stores the corresponding data assets on storage 1613. Via synchronizing application 1614, the mobile client 1610 may either push the stored media via file transfer protocol ("FTP") to the file transfer server 1622, or the synchronizing application 1614 may be remotely triggered, for example via an SMS command, to affirmatively upload the stored media as data assets.

Once the data assets are uploaded to file transfer server 1622, a crawler application 1623 periodically scans the uploaded data assets. The data assets are placed into a folder queue and optionally associated with metadata, for example in the form of metadata tags corresponding to incident, or case. Transcoder 1624 converts the file formats of the data assets into a standard format, for example one based on H.264. Once transcoding is completed, if the transcoding is successful, crawler application 1623 archives the original file and stores the transcoded video to store 1626 and a reference to the transcoded video to database 1625. In the event of error, the uploaded data asset is placed into another directory for later review.

One error that may occur in particular with data assets stored as H.264 compliant files is the loss of the file index. A file might be partially uploaded, but because the file index is stored at the end of the file, none of the partial uploaded file is usable. Prior to transmission, synchronization application 1611 might store the H.264 index in a separate file, and redundantly upload the index. Because the index is much smaller than the media data in the H.264 file, corruption is less likely. In the event the uploaded H.264 file is truncated, the complete index, uploaded separately may be used to decode the portion of the H.264 file that arrived. If the H.264 file arrived intact, then the redundant index may be discarded.

Once data assets have been stored in the database 1625 and store 1626, they are accessible via a website 1627. The website may include functionality to search and view videos including external data such as case data. For example, it may enable "computer aided dispatch", where an officer is dispatched to a crime scene, incident information is entered by the dispatch via website 1627 and uploaded to database 1625, data assets are uploaded from mobile client 1610 or 1630, tagged with metadata corresponding to the incident, and the searched and viewed in composite afterwards.

Website 1627 may also provide various ways to quickly review video files. For example website 1627 might provide thumbnail or videocap views of videos to aid visual search. In some cases, a scroll bar might be displayed to allow the user to scan through individual frames in the video, rather than merely viewing a default frame.

Website 1627 may also integrate with external websites. For example, a supervisor may access website 1627 and upload a video to a public social networking site as part of a public alert such as missing child alert ("Amber alert").

Website 1627 may also provide visibility to monitor the status of uploaded data assets, and provide for bandwidth management and prioritization. For example, website 1627 may show what data assets have been uploaded, transcoded, or what percentage of the process is complete. It may also show which data assets have errors or are otherwise corrupt. Specifically, the website 1627, may review the contents of the file transfer server 1622 directories which store uploaded data assets, archived data assets, and corrupt data assets. It may further receive notifications from crawler application 1623 as to what percentage of an operation such as transcoding is complete. If a data file is to be prioritized for upload or transcoding, the website 1627 might provide a control to configure the crawler application 1623 accordingly.

Mobile client 1630 shows an alternative architecture for a client. Here car service 1631 combines the functionality of client application 1612 and synchronizing application 1614. Additionally, it provides network connectivity to a supervisor application 1640. Supervisor application provides the ability to provide remote control over client 1630 and to view configuration, status, and stored data assets on client 1630. On mobile client 1630, the mobile configuration and the captured data assets are stored in the same store 1632. Data assets are captured and reviewed locally by application 1633.

The following describes features and advantages enabled by the platform as disclosed for law enforcement.

(i) Chain of Custody

Police and security video may be used in evidence at trial. However, in order to be admissible, the evidence must be stored such that an unbroken chain of custody can be made, ensuring that the evidence was not tampered with. With the embodiments as disclosed, a metadata tag to store an Officer ID and a metadata tag to store a timestamp and action may be made. When the police video is stored, the tag stored the Officer ID of the owner of the mobile client. When the officer uploads for storage, the officer authorizes the upload which again tags the police video with Officer ID, timestamp, and action. When the data is received and archived, the archival officer may again tag the police video with his Officer ID, timestamp and action. Thus at all stages, the chain of custody of the video may be verified. For further security the metadata may be encrypted. Alternatively, checksums may be archived in a database to detect later tampering.

(ii) Providing Video ID

Because all video is uploaded and archived, citizens who have been stopped may request an identifier for the video clip capturing their stop and a limited access account. The citizen may then go to the law enforcement agency's web site, log on, and then view the footage of their stop. This will provide an incentive for officers to avoid excessive force and can provide evidence for and against any culpability.

(iii) Monitored Interrogation

When suspects in custody are interrogated by police officers, typically there is a camera to memorialize the event. However, a determined police officer can disable a typical security camera. If a mobile client enabled with RFID and preview is in the room, it will be difficult to tamper with the camera. Specifically, an officer with an RFID badge enters the interrogation room. The RFID badge not only triggers video recording, it also makes use of preview mode to capture the first 10 seconds prior to entry. Therefore, even if the officer were to tamper with the camera, the camera would have captured the first few seconds and would detect the tampering.

(iv) Emergency Dispatch

Often officers enter hazardous situations. When an officer is assaulted, the officer may hit a hotkey on the mobile device that acts as a panic button. The mobile client sends a notification that includes the officer identity and the officer's location which then goes to the NOC. The supervisor mode of the NOC includes map showing nearby officers which are also broadcasting their locations via GPS or other location services. The officer at the NOC may then quickly dispatch the proximate officers to the location.

(v) Blackout Versions of Video

Police videos are often used as evidence in trial. The embodiments as disclosed support post process editing of videos. Because it may be desirable to black out portions of video as unfairly prejudicial, both district attorneys and defense lawyers may edit out or black out portions of video to be left out of the trial record. One way to do this is via professional post processing tools. A less expensive alternative would be to use an overly tool (a block of non-color over top of the video) to place overlays blocks over the portions of the video to be blocked out. In this way, not only could portions of frames be provided rather than full blackout, faster turnaround of editing could occur.

Security Camera Scenario Embodiment

A variation of mobile officers carrying mobile clients is to have a mesh of security towers covering a geographic area. This would enable close circuit surveillance over an arbitrary area with minimal installation costs. Examples of locations where these may be applicable include but are not limited to be college campuses, airports, prisons and high crime areas. It is to be noted that a mesh of camera towers need not be limited to law enforcement scenarios. For example, a mesh of camera towers at a sporting event or an entertainment event would provide improved media coverage of the event. Each of the towers would have a mobile client configured with a full network stack to allow remote control over IP and Wi-Fi and a file manager to manage file upload and file deletion. Both the network stack and the file manager are discussed in FIG. 13 and the supporting text.

Each camera is network enabled and is independent in that it is a self-contained recording and storage device that adds metadata such as time and location. Because the cameras house these on board capabilities, all that is needed locally is power. No communication cabling would be required.

Each camera could be configured to host a synchronizing application that was able to detect proximate cameras. An embodiment would be to refer to a web service that tracked the location of each installed camera, and from knowledge of its local location, could select proximate cameras.

To aid in backwards compatibility, where a camera did not have the necessary hardware initially, a hardware block with the missing hardware, e.g., to enable network connectivity, could be attached, and the necessary software components installed. Accordingly, previously purchased hardware could be made to be compatible for mesh applications.

However, collectively the cameras act together as a mesh of cameras that give a law enforcement agency a comprehensive view of what happened at the same location or close by locations at the same time. A NOC's supervisor mode could quickly search for all uploaded data assets from the camera at a particular time and location, and then view and edit them together.

Note that the cameras all networked peer to peer devices. Accordingly, an officer cold come to a location where there were several devices present, such as the scene of a crime or other event, and could determine on his laptop or cell phone the locations of all the cameras. The officer could then choose cameras to download video to his laptop or cell phone, or by default download all videos from the surrounding cameras.

A camera need not start out as part of a mesh. A camera may operate independently until another camera is added to the network to establish a mesh. Thus a single camera, perhaps mounted on a pole, could provide ad hoc surveillance in a relatively short period of time. As time went on, other cameras could be incrementally added to establish a mesh. Cameras could also be removed as necessary.

Sports Replay Scenario Embodiment

A non-law enforcement scenario for using mesh is to replay sports games. Professional and other sports team's videotape games and practices to better assess points of weakness and to identify ways to improve the team and individual player's performance. An ability to view a play or action from multiple angles would provide a comprehensive way to assess the action.

By providing a mesh of multiple cameras incorporating the disclosures herein, multiple cameras may synchronize to the same clock. If four surrounding cameras were configured to view a play and were synchronized, the configuration would provide a quad view. Alternatively, cameras in the mesh could provide a mix of different views, for example a coach's view, views from two different players, and perhaps two sideline shots.

Per editing software using the metadata features disclosed herein, metadata specific to game analysis indicating for example the particular play, the context of the game and players involved could be added. For example for a football game, metadata indicating that a particular segment of media represented a first down, a running play, where Jones was the runner could be added. In addition to providing context upon playback, it also provides metadata enabling searching and filtering on kinds of plays, players, and other elements of interest in analyzing the game.

The game analysis metadata need not be rendered, but could also be used for statistical analysis of the game. One could determine likelihood of how a team or player reacted according to different situations. For example in football, one could determine that a team was significantly more likely to do a long pass on a first down than other teams.

Cameras using the present embodiment have a sharable format, thus different teams could agree to share media with each other. Because the camera's clocks could be synced to a global source, e.g., a web accessible value of global time, the different media could be synchronized with each other, even though they had been recorded separately by different parties. Accordingly, different views designed from different perspectives may be correlated together.

Other Possible Commercial Embodiments

Commercial embodiments are not limited to law enforcement. The following are some other commercial scenarios supported by the platform.

(i) Taxicab Scenario

The embodiments as disclosed can replace a taxicab's meter box and camera with a single device. Currently, most taxicabs install a meter box to show the fare charge. Some taxicabs also install a camera to show the face of the driver to the passenger. However meter boxes only show charges, not distance, route, or other information that may be of interest to the passenger.

A taxicab hosted client as disclosed, with a video camera and a GPS or other geolocation tracker, integrated with a map database and an external charge database may perform the roles of the meter box and camera for a lower price and with greater functionality including but not limited to: (a) a view for the passenger with start and end points on the map, with the specified route as calculated by software also shown so the passenger could proactively request a different route; (b) the passenger view displaying progress on the route by showing the taxicab's GPS tracking samples as the trip progresses; (c) the passenger view additionally showing not just taxicab fare information, but also time and distance information, traffic alerts, predictions of arrival time; (d) a log of the trip could be stored and uploaded via the mobile connection, or in the alternative could update via Wi-Fi upon parking, in order to provide an audit trail to a central office; (e) the passenger view could provide average trip times and other aggregated information from the audit information; (f) the client integrated with a printer could give a receipt with the information from the view upon request of the passenger; and (g) uploaded audit information could be used in training new taxicab drivers.

(ii) School Bus Scenario—Child Tracking

The present embodiments could monitor pickup and drop off of children. Currently typical school buses do not have onboard cameras. Accordingly, determining whether a child was dropped off at the correct location on the way home, or in the alternative determining if a child was correctly picked up relies on the bus driver's memory. In the case of a missing child, the camera could provide objective evidence as to whether the child was on the bus or not.

A school bus hosted client of the present embodiments with an eventing system for door opening and closing, a video camera with preview, and a geolocation tracker, integrated with a map database includes but is not limited to the following advantages: (a) when the school bus door opens or closes, the custom eventing system could trigger recording of the video camera; (b) the video camera would have several seconds of preview buffer, so would record a those several seconds along with the actual event of a child entering or exiting the school bus; (c) the custom eventing system could trigger turning off the video camera; (d) the geolocation tracker could trigger upon turning on the camera as well and along with a map database indicate where the pickup or drop off occurred; (e) the information could be archived to a central office via cellular upload or Wi-Fi; and (f) the archived information could be aggregated for statistics and in where no errors of pickup or drop off occurred, the information could be deleted to save storage.

(iii) Trucker Scenario

The present embodiments could monitor accidents for bulk transportation such as semi-rig trucks. Currently semi-rigs do not have onboard cameras. Accordingly, disproving the liability of a semi-rig in the event of an accident is difficult.

A truck hosted client of the present embodiments with an eventing system triggered by a vehicle crash detector such as disclosed in U.S. Pat. No. 4,161,228 which triggers airbags, a video camera with preview, a geolocation tracker integrated with a map database includes but is not limited to the following advantages: (a) when the vehicle crash detector detects a crash, the custom eventing system could trigger recording of the video camera; (b) the video camera would have several seconds of preview buffer, so would record a those several seconds along with the actual event of the crash; and (c) the geolocation tracker could trigger upon turning on the camera as well and along with a map database indicate where the accident occurred and upon upload could notify a central office as to dispatch a response team. Additional advantages may be realized by further integration with a telematics system which provides additional digital telemetry about the state of the truck. For areas that did not have cell phone coverage, alternative data transport such as packet radio could be implemented.

(iv) School Bus Scenario—Accident Tracking

As a hybrid of the previous School Bus and Trucking scenarios, an embodiment of the present disclosure could monitor accidents on school buses as well. Currently school buses do not have onboard cameras. Accordingly, determining causality and harm to children on the bus is difficult to prove.

A set of school bus hosted clients as described by the present disclosure, specifically with one or more cameras recording events outside of the bus and one or more cameras recording events within the bus, with an eventing system for crash detection, a video camera with preview, and a geolocation tracker integrated with a map database includes but is not limited to the following advantages: (a) comprehensive monitoring for how events outside of the bus impact events inside the bus, including but not limited to bus collisions; (b) the video camera would trigger from a collision and would have several seconds of preview buffer enabling it to record several seconds prior to the collision; (c) the crash detector event could also trigger a collision message to a central location along with geolocation data indicating where the collision occurred; (d) the information could be archived to a central office via cellular upload or Wi-Fi; and (e) the central office could collect media from cameras not on the bus to provide different angles of the accident.

The descriptions of the above scenarios are not intended to be an exhaustive list of uses of the present embodiments and are only some of the many possible applications made possible.

CONCLUSION

In compliance with the statute, the subject matter of this application has been described in a language more or less specific as to structure and method features. It is to be understood, however, that the embodiments are not limited to the specific features described, since the disclosure herein comprise exemplary forms of putting the present embodiments into effect. The present embodiments are, therefore, claimed in any of its forms or modifications within the proper scope of the appended claims appropriately interpreted in accordance with the doctrine of equivalents and other applicable judicial doctrines.

What is claimed is:

1. A system, comprising:
one or more processors; and
memory including a plurality of computer-executable instructions that are executable by the one or more processors to perform a plurality of actions, the plurality of actions comprising:
dividing a data file into multiple data portions for storage at multiple cloud computing providers;
configuring software infrastructure components of the multiple cloud computing providers to store the data portions of the data file;
storing the data portions at different cloud computing providers of the multiple cloud computing providers;
determining a current or imminent security breach exists with respect to a target one of the data portions stored at a first cloud computing provider of the multiple cloud computing providers, the current or imminent security breach including an unauthorized or undesired access to the target data portion; and
initiating a transfer of the target data portion to an existing second cloud computing provider of the multiple cloud computing providers or a new cloud computing provider,
wherein the configuring includes:
receiving an infrastructure component specification that specifies common software infrastructure components of multiple cloud computing providers that are to store the data portions of the data file;
identifying software infrastructure components of a cloud computing provider that is to store a data portion of the data file via a virtual machine (VM);
determining one or more software infrastructure components that are missing from the cloud computing provider;
generating configuration data that causes a VM configuration utility to provision the VM to be created by the cloud computing provider with the one or more missing software infrastructure components at a runtime of the VM;
sending the configuration data and a command to activate creation of the VM on a cloud of the cloud computing provider to the VM configuration utility; and
initiating storage of the data portion in the VM in response to the VM configuration utility causing the cloud computing provider to create the VM and provisioning the VM with the one or more missing software infrastructure components from another cloud computing provider.

2. The system of claim 1, wherein the data file includes at least one of one or more data assets that are captured by a user device or metadata that is associated with the one or more data assets, and wherein a data asset is an audio recording, a video recording, or a multimedia recording that captures an event that is related to a crime.

3. One or more non-transitory computer-readable media storing computer-executable instructions that upon execution cause one or more processors to perform acts comprising:
identifying software infrastructure components of an original cloud computing provider that is currently storing data via a first virtual machine (VM);
identifying software infrastructure components of an alternative cloud computing provider that is to store at least one portion of the data via a second VM, the second VM to be created by the alternative cloud computing provider;
determining one or more software infrastructure components that are missing from the alternative cloud computing provider;
generating configuration data that causes a VM configuration utility to provision the second VM to be created by the alternative cloud computing provider with the one or more missing software infrastructure components at a runtime of the second VM;

sending the configuration data and a command to activate creation of the second VM on a cloud of the alternative cloud computing provider to the VM configuration utility; and initiating a backup or a transfer of at least one portion of the data from the first VM to the second VM in response to the VM configuration utility causing the alternative cloud computing provider to create the second VM and provisioning the second VM with the one or more missing software infrastructure components.

4. The one or more non-transitory computer-readable media of claim 3, wherein the VM configuration utility provisions the second VM at the runtime with the one or more missing software infrastructure components from a third-party provider.

5. The one or more non-transitory computer-readable media of claim 3, wherein the backup includes backing up the at least one portion of the data from the first VM to the second VM according to a mirroring or striping scheme.

6. The one or more non-transitory computer-readable media of claim 5, wherein the initiating the backup or the transfer includes:

deactivating delivery of any new incoming data used to provide a particular cloud service to a first VM of the original cloud computing provider;

initiating provisioning of a second VM of the alternative cloud computing provider with the new incoming data;

initiating copying of existing data from the first VM of the original cloud computing provider to the second VM of the alternative cloud computing provider;

activating execution of the particular cloud service on the second VM of the alternative cloud computing provider based on the existing data and any new incoming data;

initiating a deactivation of the first VM on the original cloud computing provider; and activating deletion of the existing data from a cloud of the original cloud computing provider.

7. The one or more non-transitory computer-readable media of claim 3, wherein the initiating the backup or the transfer includes initiating a straight copying of generic data from the first VM to the second VM or initiating loading of application-specific data stored in a database of the first VM into a database of the VM via a data loader, wherein the application-specific data includes data that is at least one of used by a server application, used by a custom application, or in a proprietary database format.

8. The one or more non-transitory computer-readable media of claim 7, wherein the data loader is triggered to load the application-specific data by the VM configuration utility or a scheduler.

9. The one or more non-transitory computer-readable media of claim 3, wherein the identifying the software infrastructure components of the original and alternative computing cloud providers includes performing the identifying in response to:

a command to transfer or backup the at least one portion of the data from the original cloud computing provider to the alternative cloud computing provider, a determination that the original cloud computing provider failed to fulfill a corresponding service level agreement (SLA) with respect to the data, or a determination that a current or imminent security breach exists with respect to the data.

10. The one or more non-transitory computer-readable media of claim 3, wherein the software infrastructure components of the original cloud computing provider and the alternative cloud computing provider differ in at least one server infrastructure component, at least one cloud infrastructure component, or at least one application component.

11. The one or more non-transitory computer-readable media of claim 3, wherein the data include at least one of one or more data assets that are captured by a user device or metadata that is associated with the one or more data assets.

12. The one or more non-transitory computer-readable media of claim 11, wherein a data asset is an audio recording, a video recording, or a multimedia recording that captures an event that is related to a crime.

13. A computer-implemented method, comprising:

identifying software infrastructure components of an original cloud computing provider that is currently storing data via a first virtual machine (VM), the data including at least one of one or more data assets that are captured by a user device or metadata that is associated with the one or more data assets;

identifying software infrastructure components of an alternative cloud computing provider that is to store at least one portion of the data via a second VM, the second VM to be created by the alternative cloud computing provider;

determining one or more software infrastructure components that are missing from the alternative cloud computing provider;

generating configuration data that causes a VM configuration utility to provision the second VM to be created by the alternative cloud computing provider with the one or more missing software infrastructure components at a runtime of the second VM;

sending the configuration data and a command to activate creation of the second VM on a cloud of the alternative cloud computing provider to the VM configuration utility; and initiating a backup or a transfer of at least one portion of the data from the first VM to the second VM in response to the VM configuration utility causing the alternative cloud computing provider to create the second VM and provisioning the second VM with the one or more missing software infrastructure components from a third-party provider.

14. The computer-implemented method of claim 13, wherein the data asset is an audio recording, a video recording, or a multimedia recording that captures an event that is related to a crime.

15. The computer-implemented method of claim 13, wherein the backup includes backing up the at least one portion of the data from the first VM to the second VM according to a mirroring or striping scheme.

16. The computer-implemented method of claim 13, wherein the initiating the backup or the transfer includes:

deactivating delivery of any new incoming data used to provide a particular cloud service to a first VM of the original cloud computing provider;

initiating provisioning of a second VM of the alternative cloud computing provider with the new incoming data;

initiating copying of existing data from the first VM of the original cloud computing provider to the second VM of the alternative cloud computing provider;

activating execution of the particular cloud service on the second VM of the alternative cloud computing provider based on the existing data and any new incoming data;

initiating a deactivation of the first VM on the original cloud computing provider; and activating deletion of the existing data from a cloud of the original cloud computing provider.

17. The computer-implemented method of claim 13, wherein the initiating the backup or the transfer includes initiating a straight copying of generic data from the first VM to the second VM or initiating loading of application-specific data stored in a database of the first VM into a database of the VM via a data loader, wherein the application-specific data includes data that is at least one of used by a server application, used by a custom application, or in a proprietary database format.

18. The computer-implemented method of claim 13, wherein the identifying the software infrastructure components of the original and alternative computing cloud providers includes performing the identifying in response to:
   a command to transfer or backup the at least one portion of the data from the original cloud computing provider to the alternative cloud computing provider,
   a determination that the original cloud computing provider failed to fulfill a corresponding service level agreement (SLA) with respect to the data, or
   a determination that an existing or imminent security breach exists with respect to the data.

19. The computer-implemented method of claim 13, wherein the software infrastructure components of the original cloud computing provider and the alternative cloud computing provider differ in at least one server infrastructure component, at least one cloud infrastructure component, or at least one application component.

* * * * *